US012739471B2

(12) United States Patent
Phillips et al.

(10) Patent No.: US 12,739,471 B2
(45) Date of Patent: Sep. 15, 2026

(54) MANAGING DEVICE POWER RESOURCE DURING PRESENTATION OF CONTENT

(71) Applicant: Adeia Guides Inc., San Jose, CA (US)

(72) Inventors: Christopher Phillips, Hartwell, GA (US); Charles Dasher, Lawrenceville, GA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/062,505

(22) Filed: Feb. 25, 2025

(65) Prior Publication Data

US 2026/0255018 A1 Aug. 27, 2026

(51) Int. Cl.
*H04N 21/443* (2011.01)
*H04N 21/462* (2011.01)

(52) U.S. Cl.
CPC ..... *H04N 21/4436* (2013.01); *H04N 21/4621* (2013.01)

(58) Field of Classification Search
CPC ....................... H04N 21/4436; H04N 21/4621
See application file for complete search history.

(56) References Cited

U.S. PATENT DOCUMENTS 8,964,828 B2 * 2/2015 Raveendran ....... H04N 21/4348 375/240
9,749,373 B2 * 8/2017 Dave ..................... H04L 65/612
10,021,440 B2 * 7/2018 Christie ............. H04N 21/4627
11,252,471 B2 * 2/2022 Leduby .............. H04N 21/4424
11,770,588 B2 * 9/2023 Gupta ................ H04N 21/8455 725/88
2008/0010584 A1 * 1/2008 Corsetti ................. G06Q 30/02 715/201
2010/0046631 A1 * 2/2010 Raveendran ....... H04N 21/4436 375/E7.027
2010/0150245 A1 * 6/2010 Camp, Jr. .............. H04N 19/33 375/240.25

(Continued)

OTHER PUBLICATIONS

Kranzler, M. et al., "Optimized Decoding-Energy-Aware Encoding In Practical VVC Implementations", arXiv:2206.13483v1, Jun. 27, 2022, 5 pages.

(Continued)

*Primary Examiner* — Michael B. Pierorazio
(74) *Attorney, Agent, or Firm* — HG LAW LLP

(57) ABSTRACT

Methods and systems are disclosed herein for enabling an improved management of power resource of a device during content presentation. A device profile comprising, for a codec supported by the device, a plurality of format tuples, each format tuple having an associated power usage, is determined. A selection of a content item for the presentation on the device is received. A manifest file comprising, for the codec supported by the device, a set of representations for generating the content item for presentation on the device, wherein each representation in the set comprises a format tuple different from the other representations in the set. A first subset of representations from the set of representations is selected, based on the device profile, resulting in a quality level and a power usage associated with the presentation of the content item over the duration of the presentation of the content item on the device.

20 Claims, 19 Drawing Sheets

(56) References Cited

U.S. PATENT DOCUMENTS

| | | | | |
|---|---|---|---|---|
| 2012/0110036 | A1 * | 5/2012 | Rabii | H04N 21/41407 707/822 |
| 2019/0174185 | A1 * | 6/2019 | Leduby | H04N 19/102 |

OTHER PUBLICATIONS

Meng, J. et al., "Proactive Energy-Aware Adaptive Video Streaming on Mobile Device", USENIX Annual Technical Conference, Jul. 14-16, 2021, pp. 81-97.

Turkkan, B. O. et al., "GreenABR: energy-aware adaptive bitrate streaming with deep reinforcement learning", MMSys '22: Proceedings of the 13th ACM Multimedia Systems Conference, Jun. 14-17, 2022, pp. 150-163.

U.S. Appl. No. 19/095,942, filed Mar. 31, 2025 (USPTO in possession of specification, claims, and prosecution history).

* cited by examiner

420

421

Fig. 10 (Cont. I)
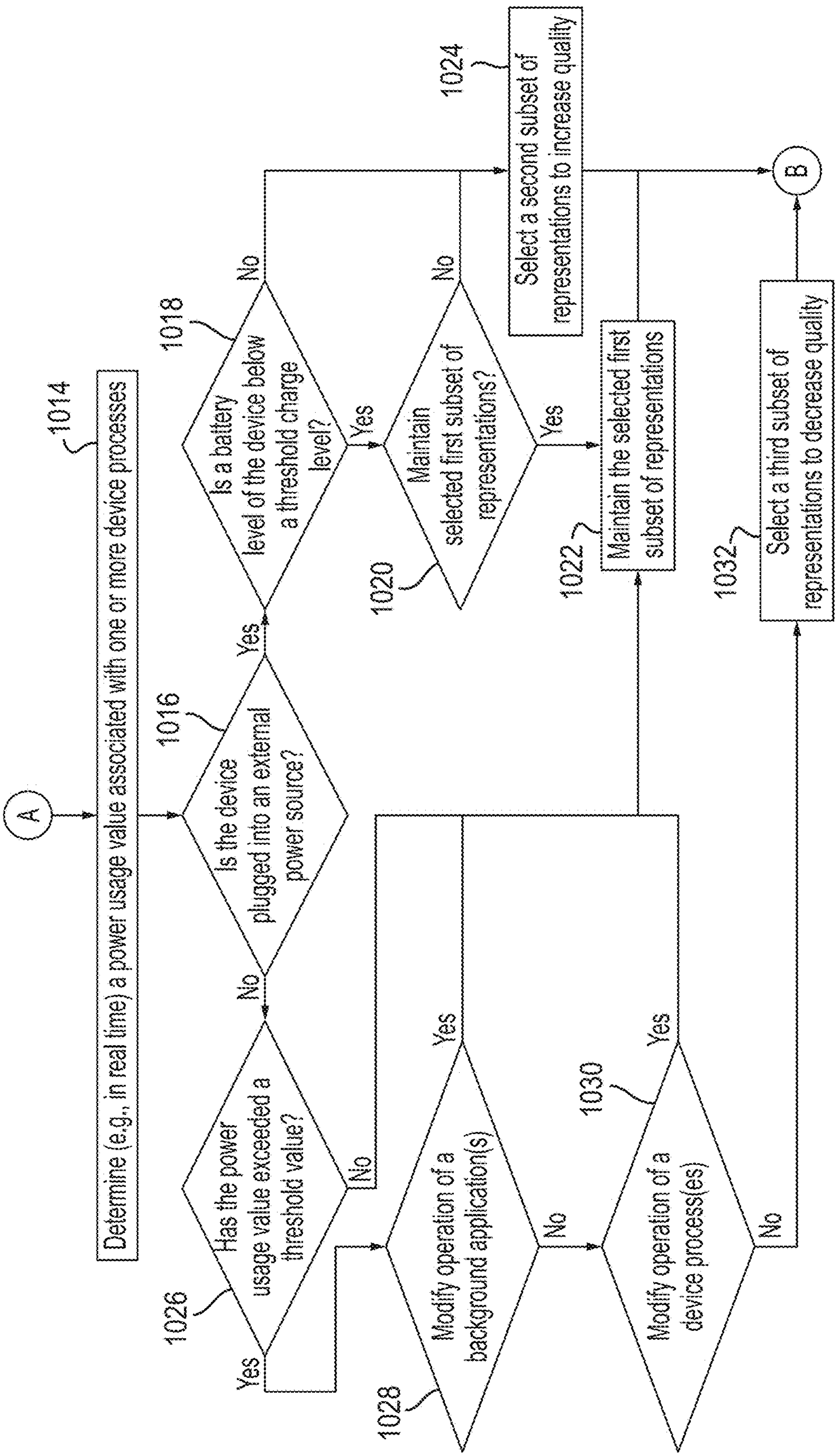

Fig. 10 (Cont. II)
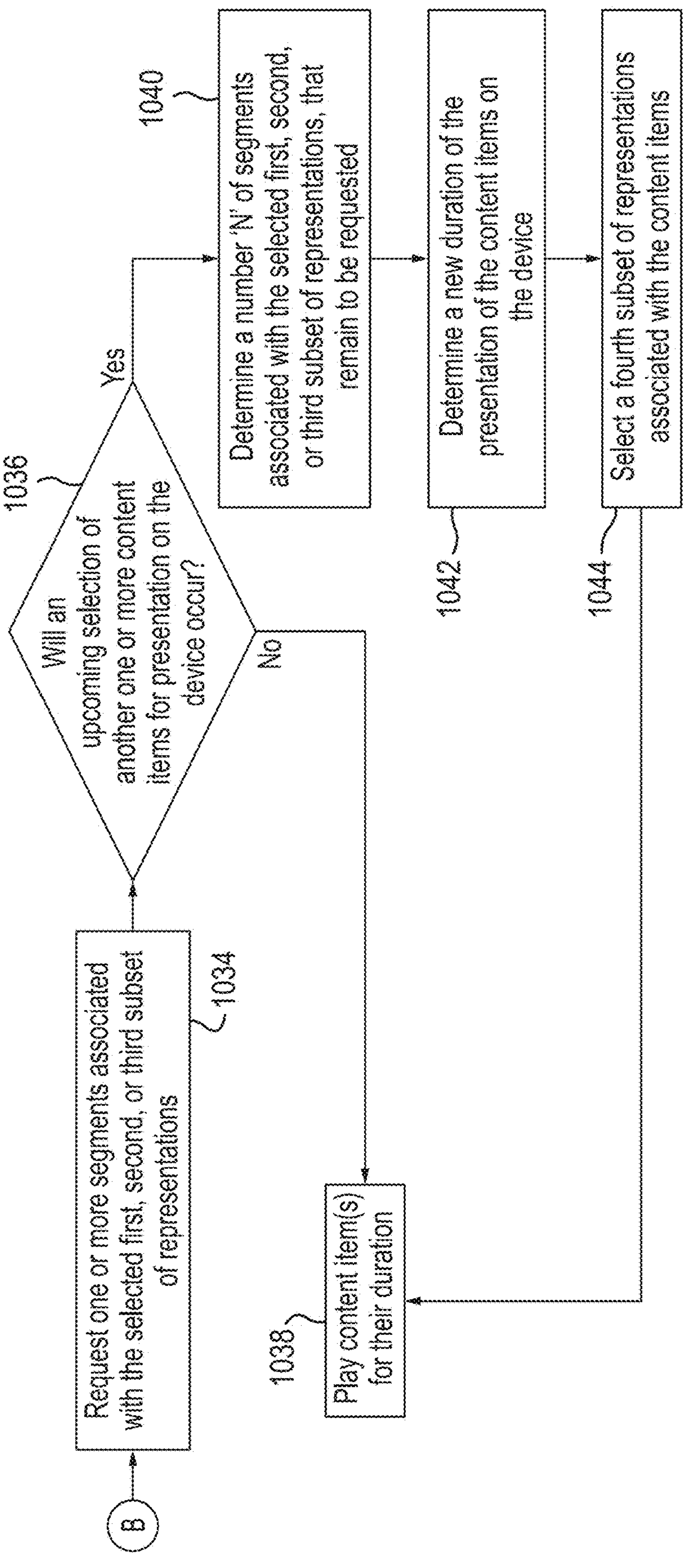

```
.
.
.
<!-- AVC/H.264 Base Profile Adaptation Set -->
<!-- Base Profile (AVC) -->
1131 <AdaptationSet id="1" mimeType="video/mp4" segmentAlignment="true" startWithSAP="1"
subsegmentAlignment="true">
1106                                    1104                          1102
1101 <Representation id="avc_base_1080p30" codecs="avc1.42C01E" width="1920" height="1080"
frameRate="30" bandwidth="8000000"> 1108
<SegmentTemplate timescale="1000" media="avc_base_1080p30_$Number$.m4s"
initialization="avc_base_1080p30_init.mp4" duration="3000" startNumber="1" />
</Representation>
.
.
.
1116 </Representation>                  1114                          1112
1111 <Representation id="avc_base_1080p24" codecs='avc1.42C01E" width="1920" height="1080""
frameRate="24" bandwidth="6000000"> 1118
<SegmentTemplate timescale="1000" media="avc_base_1080p24_$Number$.m4s"
initialization="avc_base_1080p24_init.mp4" duration="3000" startNumber="1" />
</Representation>
.
.
.
                                1124
1121 <!-- Audio Adaptation Set (Common for All Video Formats) --> 1122
<AdaptationSet id="6" mimeType="audio/mp4" codecs="mp4a.40.2" lang="en" startWithSAP="1">
<Representation id="audio_128kbps" bandwidth="128000"> 1128
<SegmentTemplate timescale="1000" media="audio_$Number$.m4s"
initialization="audio_init.mp4a" duration="3000" startNumber="1" />
</Representation>
</AdaptationSet>
</Period>
</MPD>
```

MANAGING DEVICE POWER RESOURCE DURING PRESENTATION OF CONTENT

BACKGROUND

The present disclosure relates to methods and systems for enabling improved management of power resource of a device during presentation of content. In particular, but not exclusively, the methods and systems may select, for distribution using adaptive bitrate streaming (ABR), a set of representations from a manifest based on a power usage profile of the device resulting in an optimal quality of the media content item over its duration.

SUMMARY

A portable device, such as a laptop, a tablet, a mobile phone, smart watches and the like, usually operates on an internal power source (e.g., battery) when not connected to an external power source (e.g., electrical grid, generator). The device can be configured to run an operating system (OS) managing device components (e.g., hardware, software, files, memory, and processes), and data input/output, based on the power available to the portable device and OS settings. Performing device processes, in effect, requires CPU/GPU and hardware usages, which amount to a cumulative power usage (e.g., battery load). OS settings may be modified, e.g., by a user or automatically, to vary the cumulative power usage associated with portable device operations. For instance, decreasing a display brightness by adjusting a brightness setting or closing background applications may reduce the cumulative power usage. Conversely, streaming content at a high bitrate, resolution, frequency, etc., while viewing the content at a high brightness on the portable device contributes to the cumulative power usage. The portable device may sometimes respond to a high cumulative power usage by switching to a battery savings mode (e.g., low power mode) to extend the battery life, resulting in a battery life extension. However, such an extension may be insufficient to permit the presentation of the content in its entirety.

Streaming a content item for presentation on a device may be divided into multiple tasks associated with streaming content, e.g., demultiplexing an audio/video signal into encoded segments (e.g., video and/or audio encoded segments), decoding encoded segments, post decode processing decoded segments (by applying post decode processing filters to decoded segments), and rendering, based on the post decode processing filters, decoded segments on a presenter (e.g., a display or speakers), each task being associated with a power usage and impacting the cumulative power usage. Additionally, the nature of the device hardware (e.g., mobile or Wi-Fi modem, internal or external display, and if an external display is used, external display may be connected to the device, wirelessly or via a wire such as a HDMI cable) used for content presentation and the way the various components of the device hardware are connected to each other, may also affect the cumulative power usage.

In some approaches, the cumulative power usage during content streaming may be reduced by selectively decreasing a power usage associated with decoding one or more encoded segments. At encoding, multiple codec profiles associated with a single codec, e.g., versatile video coding (VVC), are generated by disabling one or more parts of coding tools of the single codec. Power usages associated with decoding the one or more segments encoded following the multiple codec profiles are measured to determine the most energy efficient codec profile to decode encoded segments associated with content. Such approaches nevertheless neglect other popular codecs and related codec profiles in the determination of the most energy efficient codec profile to decode encoded segments associated with content. In some approaches, the cumulative power usage during content streaming is reduced by determining, e.g., via machine learning, the optimal bitrate/resolution tuple that ensures an acceptable perceptual video quality expressed, e.g., as video multi-method assessment fusion (VMAF). Such approaches, for example, dismiss other segment characteristics that may impact the cumulative power usage besides relying on complex AI tools. In some approaches, the cumulative power usage during content streaming is reduced by integrating an application adaptation logic with a user specified energy budget to determine in real time the optimal resolution/frame rate tuple to balance video quality and power usage. All the aforementioned approaches may not: (1) address, in a single common response, the optimization of power usages associated with every streaming-related tasks; (2) leverage the whole range of popular codecs or codec profiles, and segment characteristics that may impact these power usages; (3) gain an awareness, prior to streaming content, of the most energy efficient tuples comprising a codec (or codec profile), and a set of segment characteristics, where each segment characteristic is set to a value selected among one or more available values; (4) consider the uniqueness of each device in power consumption performance. (The numberings do not indicate a preferential order.) Accordingly, there is room for improvement in power conservation within portable devices.

Methods and systems, e.g., implemented by a device (e.g., portable device, user portable device), are disclosed herein for enabling an improved management of a device power resource during a presentation, on the device, of a content item (e.g., a live or recorded content item). Such methods and systems may provide a device profile indicating updated power usage performance of the device, allowing for ranking, in terms of energy efficiency and/or quality, representations associated with a content item, differing in format tuples (comprising, e.g., codec (and/or codec profile), and a set of segment characteristics) according to which segments associated with the content item may be requested from a server, e.g., prior to or during presentation of the content item. This may allow for balancing, during content streaming, power conservation and quality (e.g., objective and/or perceptual video quality) associated with the presented content item, as well as deciding when to privilege either one. The potential of the present disclosure is thus significant, particularly for applications in mobile, tablet, laptop and wearable devices where battery life is a critical constraint. Optimizing players (e.g., ABR players) to optimally select segments (e.g., ABR video segments) based on the device OS, video decoding and rendering performance metrics affecting the device battery drain has significant benefits from a technical perspective associated with device and/or network operation. Such benefits may well lead to an increased user experience.

Besides disclosing methods and systems for enabling the improved management of the power resource of the device during the presentation of the content on the device, the present disclosure may be leveraged to generate a non-transitory computer-readable medium comprising instructions that when executed by control circuitry of the device cause the control circuitry of the device to implement one or more steps of the methods disclosed herein.

In some examples, a device profile is determined, the device profile comprising, for a codec, e.g., supported by the device, a plurality of format tuples, each format tuple having an associated power usage. A selection of a content item for the presentation on the device is received. A manifest file is received, the manifest file comprising, for the codec supported by the device, a set of representations for generating the content item for presentation on the device, wherein each representation in the set comprises a format tuple different from the other representations in the set. A first subset of representations from the set of representations is selected based on the device profile, resulting in a quality level and a power usage associated with the presentation of the content item over the duration of the presentation of the content item (e.g., the duration of the presentation of at least a portion of the content item) on the device. In some cases, the duration of the presentation of the content item may include presentation of supplemental content, such as a trailer, a recap, an advert, etc. In some cases, the device profile is determined, the device profile comprising, for a codec and a codec profile, e.g., supported by the device, a plurality of format tuples, each format tuple having an associated power usage.

In some instances, a device profile may be associated with the device, which may be periodically updated over at least a portion of the lifetime of the device. In some instances, a device profile may be an online device profile, or stored in a local storage. In some instances, the device profile may be generated during an installation of an OS on the device and updated, for example, following a new OS release. In some instances, the device profile may comprise information associated with the device, e.g., a device model, a number of years in use, a battery life indicating a current power level in the device battery, a number of years in use for the device battery, a ratio (to determine battery performance degradation over time) of a current maximum power level in the device battery to an initial current maximum power level in the device battery, a predicted battery life taking into account the battery life and a power usage for performing a future action (e.g., presenting one or more content items), device supported codecs (e.g., hardware and software supported codecs), baseline power usages associated with presentation of one or more test content items (e.g., movies, scenes, clips, specially produced content, videos, short videos, etc.), and/or user tuned OS settings (e.g., updated user tuned OS settings). In some instances, the device profile may comprise, for each of the one or more test content items, a ladder on which representations (e.g., encoded segment groups) associated with the test content item are ranked based on baseline power usages associated with the representations. In some instances, a presentation of a representation (e.g., encoded segment group) associated with a content item may comprise various processes, e.g., demultiplexing, decoding, post decode processing, rendering, and the selection of device hardware component(s) involved in the presentation of the representation. Each of these processes have an associated power usage.

In some instances, the baseline power usages associated with the presentation of the one or more test content items may comprise, for each test content item, baseline power usages associated with decoding and/or post decode processing a set of representations (e.g., a set of encoded segment groups) associated with the test content item. In some instances, the baseline power usages associated with the presentation of the one or more test content items may comprise aggregated baseline power usages associated with decoding and/or post decode processing multiple sets of representations associated with the one or more test content items. In some instances, the baseline power usages associated with the presentation of the one or more test content items may comprise, for each test content item and for each representation, baseline power usages associated with selecting device hardware components (e.g., mobile or Wi-Fi modem, internal or external display) or and a connection type between the device hardware components (e.g., wired or communication network). In some instances, the baseline power usages associated with the presentation of the one or more test content items may comprise, for each test content item and each representation, baseline power usages associated with demultiplexing an audio/video signal into an audio representation and a video representation. In some instances, the baseline power usages associated with the presentation of the one or more test content items may comprise, for each test content item and each representation, baseline power usages associated with rendering the post decode processed representation to be rendered on at least a portion of a (e.g., internal or external) display. In some instances, a baseline power usage associated with the presentation of a representation associated with a test content item may be determined by applying a series of coefficients (each coefficient representing a task associated with streaming content) onto a baseline power usage associated with decoding a representation associated with the test content item, where each coefficient of the series of coefficients exceed one.

In some instances, release of an OS image may include the one or more test content items. Alternatively, the one or more test content items may be downloaded from a server. In some instances, the release of the OS image may include a first portion of the one or more test content items, and a second portion, different from the first portion, of the one or more test content items may be downloaded from the server. In some instances, each test content item may comprise a set of representations, each representation (e.g., encoded segment group) being associated with a respective format tuple comprising, for example, a codec and codec profile (e.g., device supported codec and codec profile) and a set of segment characteristics (e.g., device supported segment characteristics) selected among resolution, frame rate, pixel bit depth, and/or bitrate, each segment characteristic being set to a value selected among one or more available values. Format tuples associated with a representation cannot be distinguished from each other based on an order of appearance of respective components (e.g., codec (and codec profile), each segment characteristic of the set of segment characteristics) of the format tuples within the format tuples. Accordingly, modifying an order of appearance of the components of a first format tuple associated with a representation '(VVC Main10 4:4:4 profile encoded stream; 360p base; 24 Hz 210 Kbps)' may generate a second format tuple '(360p base, VVC Main10 4:4:4 profile encoded stream; 24 Hz; 210 Kbps)' associated with the representation, that is considered identical to the first format tuple. In some examples, a format tuple associated with a representation comprises a codec and a set of segment characteristics. In some instances, each format tuple associated with a representation comprises a codec and a set of segment characteristics. In some instances, each format tuple associated with a representation comprises a codec (and a codec profile) and a set of segment characteristics. In some instances, a format tuple associated with a representation may comprise a codec (and codec profile) and set of segment characteristics. The set of segment characteristics may comprise a resolution, a frame rate, a pixel bit depth, and/or bitrate. In some instances, each format tuple associated with a test content item may follow this configuration.

In some instances, during the OS installation, the device may comprise a player (e.g., an ABR player, an OS install Power Analysis player) that may repeatedly present, for each test content item, in a looping manner the set of representations so as to measure, for each representation, a power usage associated with decoding and rendering the representation and provide a baseline power usage associated with decoding the representation. In some instances, after having established, for each test content item and each representation, the baseline power usage associated with decoding the representation, the player may determine (e.g., in real time or near real time) critical device parameters. For example, the player may determine device parameters such as display power usage, CPU/GPU power usage and runtimes of the test content items in order to determine, for each test content item and each representation, a baseline power usage associated with post decode processing the representation. In some instances, post decode processing a representation may comprise application of one or more post decode processing filters. A post decode processing filter may be, for example, configured for maintaining scaling of decoded frames, upscaling or downscaling decoded frames. A post decode processing filter may be configured, for example, for controlling contrast, brightness, sharpness, etc., of the frames. A post decode processing filter may be configured, for example, for controlling a refresh rate of the decoded frames. A post decode processing filter may be configured, for example, for adjusting a color gamut of the frames.

In some instances, baseline power usages associated with decoding and post decode processing a set of representations associated with a test content item may be transferred to the device profile. In some instances, multiple device profiles associated with a same device model (e.g., a popular device model) may be crowdsourced to generate a plurality of time-dependent template device profiles associated with the same device model, that take into account the battery performance degradation over time. In some instances, once time-dependent template device profiles have been established, a device (e.g., with or without a device profile) of a respective device model may request a time-dependent template device profile associated with the respective device model to establish a device profile, which may drastically reduce or even abolish testing and power usage measurement collection. In some instances, the device profile may be used along with user tuned device settings to finalize the baseline power usages.

In some instances, the selection of the content item for the presentation on the device may be based on, e.g., a user interface input (e.g., tactile input, gaze-based input, or voice command), an automatic content request embedded in an application (e.g., to provide targeted advertisement) or based on the enablement of an autoplay binging option.

In some instances, the content item may comprise a set of representations, each representation (e.g., encoded segment group) being associated with a respective format tuple comprising, for example, a codec and codec profile (e.g., device supported codec and codec profile) and a set of segment characteristics (e.g., device supported segment characteristics) selected among resolution, frame rate, image pixel bit depth, and/or bitrate, each segment characteristic being set to a value selected among one or more available values. Format tuples associated with a representation cannot be distinguished from each other based on an order of appearance of respective components (e.g., codec (and codec profile), each segment characteristic of the set of segment characteristics) of the format tuples within the format tuples. Accordingly, modifying an order of appearance of the components of a first format tuple associated with a representation '(VVC Main10 4:4:4 profile encoded stream; 360p base; 24 Hz 210 Kbps)' may generate a second format tuple associated with the representation '(360p base, VVC Main10 4:4:4 profile encoded stream; 24 Hz; 210 Kbps)' that is considered identical to the first format tuple. A format tuple associated with a representation may comprise a codec (and codec profile) and set of segment characteristics. The set of segment characteristics may comprise a resolution, a frame rate, a pixel bit depth, and/or bitrate. In some instances, each format tuple associated with the selected content item may follow this configuration.

In some instances, the manifest file may comprise information related to representations, e.g., encoded segment groups, associated with the selected content item. The information related to representations associated with the selected content item may thus comprise, for each representation, a format tuple (associated with the representation) comprising, e.g., a codec (and codec profile), and a set of segment characteristics selected among resolution, frame rate, pixel bit depth, and/or bitrate, and each segment characteristic being set to a value selected among one or more available values. The manifest file may comprise a runtime of the selected content item. The information related to representations associated with the selected content item may comprise, for each segment of a representation, e.g., the format tuple associated with the representation the segment belongs to, a temporal position within the representation, a time point range in a runtime of the content item, a duration, a location on a server, and metadata (e.g., content description of the segment). In some instances, the manifest file may comprise a Dynamic Adaptive Streaming over HTTP (DASH) manifest file such that representations associated with the selected content item may be ranked on a ladder based on quality (e.g., objective and/or perceptual video quality) associated with (the set of segment characteristics comprised in) the representations associated with the selected content item. In some instances, the Dynamic Adaptive Streaming over HTTP (DASH) manifest file may comprise representations associated with the selected content item ranked based on quality level.

In some instances, the quality (or quality level) associated with a representation associated with the selected content item may be expressed as a quality distortion metric D following the equation below:

$$D = \frac{QP^{\alpha}}{\text{Resolution}^{\beta}}$$

QP stands for a compression level, and $\alpha$ and $\beta$ are powers obeying the following inequations: $\alpha>1$ and $0<\beta<1$. The lower the quality distortion metric D, the higher the quality (or quality level).

In some instances, the player may determine, prior to or during the presentation of the selected content item, for each representation associated with the selected content item, an estimated power usage associated with a presentation of the representation (associated with the selected content item) based on a runtime of the selected content item (e.g., retrieved from the manifest file or an electronic program guide (EPG)) and a baseline power usage (e.g., retrieved from the device profile) associated with the presentation of a representation associated with a test content item, comprising a format tuple matching the format tuple associated with the representation associated with the selected content item. In some instances, the player may determine, prior to or during the presentation of the selected content item, for each representation associated with the selected content item, an estimated power usage associated with a presentation of the representation (associated with the selected content item) based on a runtime of the selected content item (e.g., retrieved from the manifest file or an EPG) and a baseline power usage (e.g., retrieved from the device profile) associated with decoding and/or post decode processing a representation associated with a test content item, comprising a format tuple matching the format tuple associated with the representation associated with the selected content item. In some instances, the player may rank, prior to or during the presentation of the content item, the representations associated with the selected content item on a ladder based on the estimated power usages and may select, for presentation, a second subset of representations based on the estimated power usages that achieve the presentation of larger portions of selected content item. In some instances, the second subset of representations may comprise at least a portion of the first subset of representations.

In some instances, the player may rank, prior to or during the presentation of the content item, the representations associated with the selected content item on a ladder based on the estimated power usages and may select, for presentation, a third subset of representations based on higher quality (e.g., objective and/or perceptual video quality) associated with the representations, e.g., associated with the segment characteristics of the representations. In some instances, the third subset of representations may comprise at least a portion of the first subset of representations.

In some instances, the player may rank, prior to or during the presentation of the content item, the representations associated with the selected content item on a ladder based on ratios of quality (e.g., objective and/or perceptual video quality) associated with (the segment characteristics of) the representations to duration of the presentation of the representations associated with the selected content item and may select, for presentation, a fourth subset of representations based on higher ratios. In some instances, the fourth subset of representations may comprise at least a portion the first subset of representations.

In some instances, the player may select the first subset of representations by determining, for each representation associated with the selected content item, which representation can be presented in its entirety based on a battery life of the device, and selecting the representations of higher quality (or quality level) as the first subset of representations. Alternatively, the player may select the first subset of representations by determining, for each representation associated with the selected content item, which representation can be presented in its entirety based on a battery life of the device, and selecting the representations of lower quality (or quality level) as the first subset of representations so as to be able to present another content item after presenting the selected content item.

In some instances, the player may rank representations associated with the selected content item based on power usages and/or quality levels, both associated with format tuples associated with the representations. In some instances, the player may select the first subset of representations based on power usages and/or quality levels, both associated with the format tuples associated with the first subset of representations.

In some examples, an operating system (OS) to the device may be installed, the installation including a distribution of test content items to the device. The device profile may be determined using the test content items.

Each device may perform, e.g., at each or at least one selected OS release, power usage tests to determine what format tuples associated with representations associated with the test content items drain the device battery and at what rates. This may be dependent on software-accelerated encoding/decoding, hardware-accelerated encoding/decoding, GPU usage based on hardware supported codecs, CPU usage based on software supported codecs, post decode processing (e.g., maintaining scaling, upscaling or downscaling; controlling contrast and brightness; controlling refresh rate of the device display), and display size.

In some instances, once the OS image has been installed on a device, the device may perform optimizations post image install before the device is usable by the user. This may or may not be indicated, to the user, through messages (e.g., "optimizing . . . " or "optimizing applications"). It is, however, a typical practice for the device/OS provider to perform these types of post process optimizations. During the OS post install optimization phase, the player of the device (e.g., an ABR player, an OS install Power Analysis player) may be configured for testing battery drain across multiple representations associated with a test content item, each representation associated with a respective format tuple. This may include leveraging all device hardware decoders and any installed software decoders on the device. The player may present (e.g., decode), for each representation associated with a test content item (each representation associated with a respective format tuple), using either hardware or software codec support.

In some instances, a native resolution for the device is also considered for a playout. For each representation (associated with a test content item) whose format tuple requires upscaling or downscaling, a scaling filter may be applied when determining baseline power usages associated with post decode processing segments of the representation. During this process, "rendering" segments of such representation on the display does not occur: the segments are processed post decoding (by application of a scaling filter) but not displayed on the device display. Once decoding each representation associated with a test content item is complete along with any post decode processing required based on format tuple, the player may determine baseline power usages (corresponding to an amount of power consumed over a duration of time) associated with decoding and/or post decode processing representations of various format tuple.

In some instances, a test may also be performed where the player may present representations associated with a test content item in its native resolution (no scaling filter applied), apply a post decode processing filter configured for controlling contrast and brightness, and determine baseline power usages associated with the internal display based on application of respective contrast and brightness filters. This may provide a way for the player to adjust the brightness and contrast through post decode processing and increase a playout time of the representations when the device solely operates on battery.

In some instances, post decode processes other than upscaling or downscaling may be performed after decoding segments of a representation associated with a content item, such as frame rate conversion. In the case of presenting a high dynamic range (HDR) content item, post decode processes such as combining multi-layers of video signals, adapting dynamic range and/or color gamut to the display capability or settings, etc. may be performed. The user tuned settings for screen refresh rate, contrast and brightness may also be considered when a representation of a content item must be adapted to be presentable on the device display, and when establishing baseline power usages.

In some instances, battery life may decrease with time and baseline power usages may consequently evolve with time and thus at each OS release.

In some examples, a power usage value associated with one or more device processes may be determined. And the first subset of representations from the set of representations may be determined based on the power usage value.

This may help achieve optimal quality (e.g., video quality) associated with the presentation of the selected content item, and optimal duration of the presentation of the selected content item, by switching between representations of respective format tuples, resulting in change in quality and power usages associated with presentation of the selected content item. In some instances, the player may lower resolution and/or reduce framerate when device processes are consuming significant power. In some instances, the player may favor resolution and/or frame rate at the detriment of the background applications and/or refresh rate, contrast and brightness, color gamut, etc.

In some instances, the one or more device processes may comprise, e.g., streaming application(s), background application(s), processes associated with demultiplexing an audio/video signal, processes associated with decoding a representation associated with a content item, processes associated with post decode processing the representation (e.g., application of one or more filters configured for maintaining scaling/upscaling/downscaling, controlling contrast and brightness, controlling color gamut, setting refresh rate, converting frame rate, etc.), processes associated with rendering (e.g., presenting) the representation on a display, processes associated with device hardware components (e.g., internal or external display; if external display selected, type of connection, e.g., wireless or via a wire such as HDMI, between the device and external display; mobile or Wi-Fi modem) involved in the presentation of the representation, etc. In some instances, a power usage associated with a device process (of the one or more device processes) running on the device at a time point may be determined (e.g., in real time or near real time). In some instances, a time-cumulative power usage associated with a device process (of the one or more device processes) running on the device over a time range may be determined (e.g., in real time or near real time) by adding power usages associated with the device process at time points within the time range. In some instances, a cumulative power usage associated with all device processes running on the device at a time point may be determined (e.g., in real time or near real time). In some instances, a time-cumulative power usage associated with all device processes running on the device over a time range may be determined (e.g., in real time or near real time) by adding cumulative power usages associated with all the device processes running at time points within the time range.

In some instances, the power usage value may be, e.g., a power usage value associated with a device process (of the one or more device processes) running at a time point, a time-cumulative power usage value associated with a device process (of the one or more device processes) running over a time range, a cumulative power usage value associated with all device processes running at a time point or a time-cumulative power usage value associated with all device processes running over a time range. In some instances, the power usage value may be expressed in power unit (e.g., Watt, Joules, etc.) or power unit (e.g., Watt, Joules, etc.) per time unit (e.g., hour, minute, second).

In some examples, the determining the power usage value associated with the one or more device processes may comprise retrieving, from the device profile, information associated with the power usage value. Alternatively or additionally, the determining the power usage value associated with the one or more device processes may comprise determining (e.g., measuring), for example, in real time or near real time, the power usage value associated with the one or more device processes.

In some instances, the information associated with the power usage value may comprise power usage assessment comprising, e.g., a power usage associated with a device process (of the one or more device processes), a time-cumulative power usage associated with a device process (of the one or more device processes), a cumulative power usage associated with all device processes, and/or a time-cumulative power usage associated with all device processes.

In some instances, the information associated with the power usage value may comprise power usage assessment related to presentation of representations associated with a first content item (e.g., test content item) prior to presentation of a second content item (e.g., a content item intended to be presented to a user) to determine the first subset of representations associated with the second content item prior to the presentation of the second content item. In some instances, the information associated with the power usage value may comprise power usage assessment related to presentation of representations associated with the second content item during presentation of the second content item to determine the first subset of representations associated with the second content item during the presentation of the second content item.

In some examples, an event may be determined, the event comprising the power usage value has exceeded a threshold value. The one or more device processes may be caused to be restricted (e.g., limited, paused, halted or stopped) when the power usage value has exceeded the threshold value.

This may allow for favoring a streaming application at the detriment of background applications, to increase user comfort during the presentation of the selected content item, by increasing quality or duration associated with the presentation of the selected content item.

In some instances, the one or more device processes may be automatically caused to be limited, paused, halted or stopped based on device settings, for example, by presenting a notification (e.g., a textual, audio and/or image-based notification) specifying a type of restriction applied to the device. A prompt (e.g., textual, audio and/or image-based prompt) may be presented to request permission, from a user, to cause the one or more device processes to be limited, paused, halted or stopped. If the permission is granted, for example, via a user interface input (e.g., tactile input, gaze-based input, voice command), the one or more device processes are caused to be restricted. The battery life may be extended by reducing a power consumption rate within the device battery, or other device process(es) may be permitted to increase power usage. If the permission is not granted, battery life may decrease at the same rate. In some instances, the one or more device processes to be caused to be restricted may be selected based on power usage associated with the one or more device processes and/or how essential the one or more device processes are from the point of view of the user and/or device. In some instances, the one or more device processes may comprise, in priority, background applications.

In some instances, a threshold value may comprise a percentage of a power usage associated with a device process (of the one or more device processes), a time-cumulative power usage associated with a device process (of the one or more device processes), a cumulative power usage associated with all device processes, and/or a time-cumulative power usage associated with all device processes. In some instances, the threshold value may be set by a user interface input (e.g., a tactile input, a gazed-based input or a voice command) or the device.

In some examples, the one or more device processes may be caused to be restricted by restricting, pausing or stopping a background application. Alternatively or additionally, the one or more device processes may be caused to be restricted by restricting a device process associated with post-decode processing.

In some instances, post decode processing may comprise applying one or more post decode processing filters configured for, e.g., maintaining scaling, upscaling or downscaling; adapting dynamic range and/or color gamut to the display capability or settings; controlling contrast & brightness; controlling display settings (e.g., refresh rate, dynamic range and/or color gamut); combining multi-layers of video signals; controlling a presentation of subtitles; controlling audio processing (e.g., volume); etc. Post decode processing may comprise tuning device hardware associated with the presentation of the selected content item, by selecting, e.g., a display type (e.g., internal or external display), a connection type between the device and the external display (e.g., wired connection via an HDMI cable or wireless connection for casting content onto the external display), a modem type (e.g., mobile or Wi-Fi modem). Furthermore, post decode processing may comprise allocating at least a portion of the device display for the presentation of the selected content item.

In some examples, a first event may be determined while the device is charging, the event comprising that a battery level of the device is below a threshold charge level. Maintaining the selected first subset of representations, resulting in an optimized battery charging speed, may be caused until the battery level of the device exceeds the threshold charge level. In some examples, a second subset of representations may be selected from the set of representations, resulting in an increase in the quality associated with the presentation of the content item over the duration of the presentation of the content item on the device.

In some instances, the device may be charged by connecting, wirelessly or via a wire, the device to an external power source, e.g., electrical grid, generator. In some instances, the threshold charge level may comprise a percentage of a battery life set automatically or by a user interface input (e.g., a tactile input, a gaze-based input, a voice command). In some instances, a prompt (e.g., a textual, audio and/or image-based prompt) may be presented to request permission, from a user, to either maintain the selected first subset of representations, resulting in an optimized battery charging speed, or select a second subset of representations from the set of representations, resulting in an increase in the quality associated with the presentation of the content item over the duration of the presentation of the content item on the device. This may allow for favoring quality associated with the presentation of the content item at the detriment of charging the device battery.

In some examples, the duration of the presentation of the content item on the device may be determined based on a runtime of the content item, a start time of the content item and a current time on the device.

In some instances, the runtime of the content item may be retrieved from the manifest file associated with the content item or an EPG. In some instances, the start time of the content item may comprise, e.g., a time point at which a progression point (e.g., a first progression point, a progression point in between the first progression point and a last progression point, or the last progression point) of the content item is being presented at the start of the presentation of the content item. In some instances, the start time of the content item may be retrieved from the manifest file. This may allow for determining a power usage associated with the presentation of at least a portion of the content item, particularly convenient when considering a time shift enabled content item. In some instances, the current time on the device may be retrieved from the device, which may comprise an internal clock. In some instances, a user input may implement, during a presentation of the content item, a fast access presentation operation (e.g., rewind, fast forward, skip forward, skip backward, one or more trick mode operations, etc.) to access, from a first progression point of the content item, a second progression point of the content item, wherein the first progression point is different from the second progression point, and each of the first progression point and second progression point is a progression point from a set of progression points of the content item comprising a start progression point, an end progression point and one or more progression points in between the start progression point and the end progression point. The runtime of the content item may depend on progression points of the content item that are to be presented. A fast access presentation operation may thus increase or reduce the runtime of the content item and a power usage associated with the presentation of the content item.

In some examples, an upcoming selection of another content item for presentation on the device may be predicted based on historic selection of content items. The first subset of representations from the set of representations may be selected based on the predicted upcoming selection and the device profile.

In some instances, the upcoming selection of the other content item for presentation on the device may be based on an enabled binge watch mode, a user interface input (e.g., tactile input, gaze-based input, voice command) or instructions (e.g., associated with targeted advertisement) from a content provider (e.g., associated with targeted advertisement). In some instances, the device profile may comprise a predicted battery life considering the battery life associated with the device profile and a power usage for performing one or more future actions (e.g., presenting at least a portion of the selected content item and/or at least a portion of the other content item). This may allow the device to re-apply, for the other content item, the baseline power usages (from the device profile) associated with the set of representations associated with the one or more test content items, and to consider an updated battery life (e.g., predicted battery life from the device profile), for example, at an end of the presentation of the content item in order to determine whether the other content item can be entirely presented, on the device, based on the updated battery life.

In some examples, determining the first subset of representations from the set of representations may comprise determining a quality distortion metric for each representation of the set of representations. Determining the first subset of representations from the set of representations may comprise selecting, from the set of representations, representations having lower quality distortion metrics. For example, a lower quality distortion metric may imply a better video quality.

This may allow for classifying the set of representations associated with the content item based on quality distortion metrics associated with the set of representations. The lower the quality distortion metric associated with a representation from the set of representations, the higher the quality associated with the presentation of the representation. The first set of representations may thus comprise representations of lower quality distortion metric.

BRIEF DESCRIPTION OF DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 11 shows an example manifest file for enabling the improved and coordinated presentation of a multi-component media content across multiple devices.

DETAILED DESCRIPTION

As referred to herein, the term 'content item' comprises an electronically consumable user asset, such as an electronic version of a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, blogs, advertisements, chat sessions, social media, applications, games, and/or any other media or multimedia and/or combination of the same.

As referred to herein, the term 'background application' should be understood to mean a secondary application other than a primary application, that performs one or more actions when the primary application overtly performs one or more actions. For instance, the primary application may be, for instance, an application configured for streaming content, for which a window is opened to allow for content consumption.

As referred to herein, the term 'codec' should be understood to mean a set of coding tools used to encode a content stream and the processes to decode the encoded content stream. In some instances, the whole set of coding tools may be used for encoding a content stream and decoding the encoded content stream. Here follows a non-exhaustive list of video codec examples: moving picture expert group advanced video coding (MPEG AVC) also called H.264, moving picture expert group high efficiency video coding (MPEG HEVC) also called H.265, and versatile video coding (VVC) also called H.266, VP9, AOMedia Video 1 (AV1).

In some instances, a subset of the set of coding tools may be used to encode a content stream and decode an encoded content stream, the subset being referred to as 'codec profile'. Accordingly, there may be one or more codec profiles per codec, that could be used to encode a content stream and decode the encoded content stream. Here follows a non-exhaustive list of codec profiles: base profile, high profile, main10 profile, Main10 4:4:4 profile, profile 0, profile 2. Associating a codec and a codec profile consequently determine a subset of the set of coding tools used to encode a content stream and decode the encoded content stream as in a non-exhaustive example list of codec/codec profiles: AVC base profile, AVC high profile, HEVC Main10 profile, HEVC Main10 4:4:4 profile, VVC Main10 profile, VVC Main10 4:4:4 profile, VP9 Profile 0, VP9 profile 2.

Figure 1:
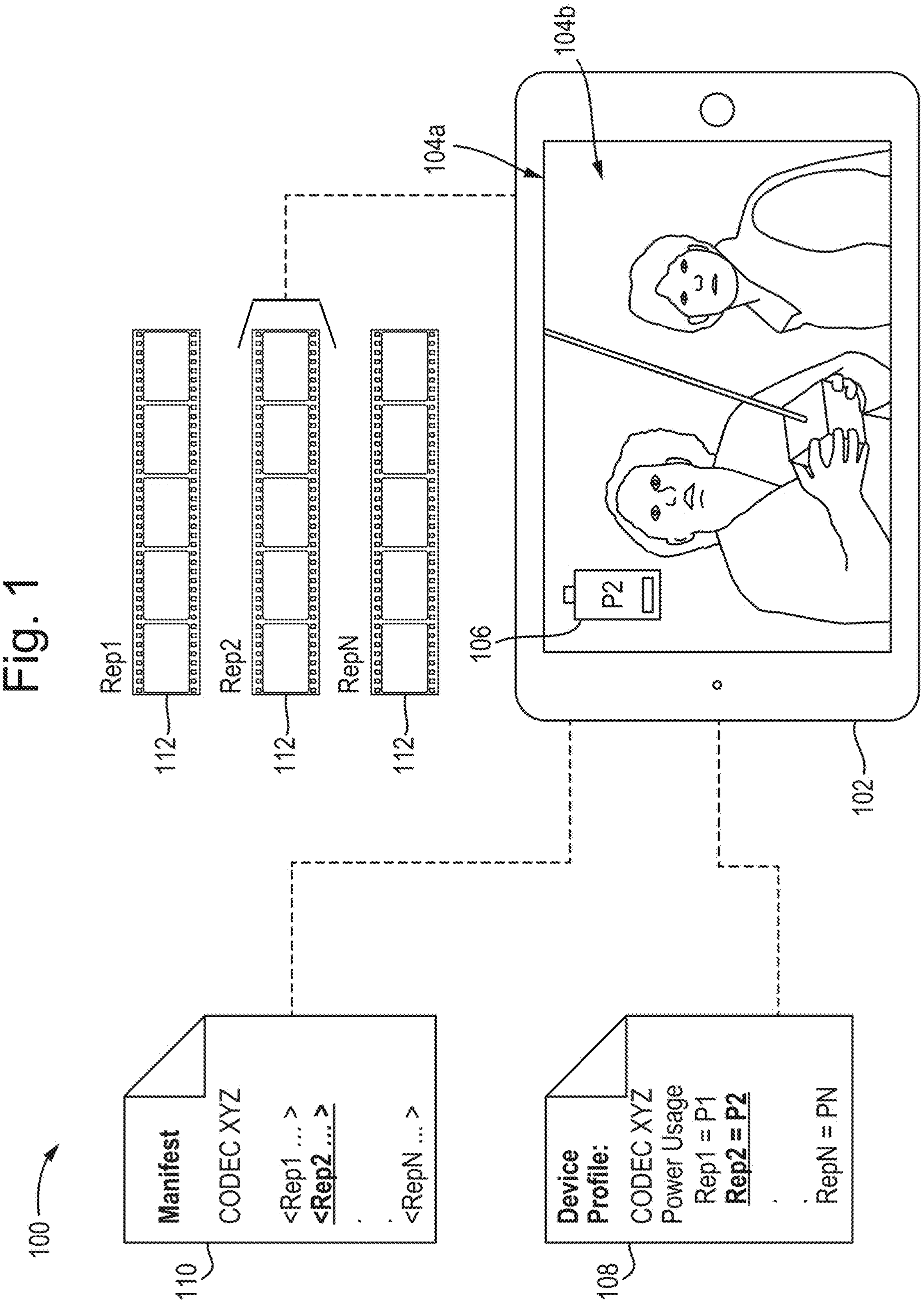
FIG. 1 shows an example for enabling the improved management of a device power resource during a presentation, on the device, of a content item, in accordance with some implementations of the disclosure.

FIG. 1 shows an example 100 for enabling the improved management of a device 102 power resource during a presentation, on device 102 (e.g., on internal display 104*a*), of a content item 104*b* (e.g., a film from the Back to the Future franchise), in accordance with some implementations of the disclosure.

Hereinafter follows a set of conditions pertinent to device 102. In some implementations, device 102 may be a portable device configured to operate on battery when unplugged to an external power source (e.g., electrical grid, generator, etc.) or from the external power source when plugged to the external power source. In some implementations, device 102 may be a laptop, a tablet, a mobile phone or the like. In some implementations, device 102 is configured to present content item 104*b* by having an internal display 104*a*, or may be connected to an external display (e.g., smart TV) via a wired connection (e.g., HDMI) or a communication network (e.g., mobile or Wi-Fi network) to wirelessly cast content item 104*b* onto the external display. In some implementations, internal display 104*a* presents a battery life icon 106 representing (e.g., in real time or near real time) a current power level in device battery. In some implementations, device 102 may comprise a modem (e.g., a mobile or Wi-Fi modem) to be in communication with a server via a communication network (e.g., mobile or Wi-Fi network).

In some implementations, device 102 is mapped to a device profile 108, e.g., stored on a server or in a local storage. In some implementations, device profile 108 may be generated during an installation of an OS on device 102 and updated, for example, following an OS update. In some implementations, device profile 108 contains information associated with device 102, for example, device model, number of years in use, battery life indicating a current power level in the device battery, number of years in use for the battery, a ratio (to determine battery performance degradation over time) of a current maximum power level to an initial current maximum power level in the device battery, device supported codecs (e.g., hardware and software supported codecs), baseline power usages each associated with a presentation of a representation (e.g., encoded segment group) of a set of representations associated with one or more test content items (e.g., short videos), the presentation of the representation involving decoding, post decode processing, and rendering the one or more test content items. In some implementations, device profile 108 may comprise a predicted battery life, wherein the predicted battery life refers to a power level in the device battery resulting from a subtraction between a current power level in the device battery and a power usage associated with a presentation of one or more content items (e.g., different from the one or more test content items).

In some implementations, a test content item (e.g., short video) may be encoded as video segments across a plurality of format tuples, each format tuple comprising a codec (and codec profile), and a set of segment characteristics selected among resolution, frame rate, pixel bit depth, and/or bitrate, and each segment characteristic being set to a value selected among one or more available values. This may thus generate, for the test content item, a set of encoded video segment groups, each encoded video segment group being associated with a respective format tuple. Decoding an encoded video segment group may cause a power usage whose extent depends upon the codec (and codec profile) and the selected segment characteristics (in terms of types and values). Accordingly, a baseline power usage may be assigned to the decoding of a respective encoded video segment group associated with a test content item.

In some implementations, device 102 may comprise an application configured for streaming content such as an application associated with an over-the-top (OTT) media services (e.g., NetFlix®, Amazon Prime®, Disney+®, Spotify®, Roku®, etc.). Device 102 may request, from the server, content item 104*b* based on, e.g., a user interface input, an automatic content request embedded in an application, (for example to provide targeted advertisement), or based on the enablement of an autoplay binging option. Based on the device request, the server may provide, to device 102, a manifest 110 (e.g., manifest file) comprising information related to encoded video segment groups 112 associated with requested content item 104*b*. The information related to encoded video segment groups 112 associated with requested content item 104*b* may thus comprise, for each encoded video segment group, e.g., a codec (and codec profile), and a set of segment characteristics selected among resolution, frame rate, pixel bit depth, and/or bitrate, and each segment characteristic being set to a value selected among one or more available values. Additionally, the information related to encoded video segment groups 112 associated with requested content item 104*b* may comprise, for each segment of encoded video segment groups 112, e.g., temporal position within the encoded video segment group, time point range in a runtime of requested content item 104*b*, location on a server, duration, metadata (e.g., description of content), codec (and codec profile) used for the encoding, and the set of segment characteristics (e.g., resolution, frame rate, pixel bit depth, and/or bitrate) and values associated with the set of segment characteristics. Device 102 may use manifest 110 to determine which segments associated with requested content item 104*b* to request from the server to decode, post-decode process and render requested segments and present content item 104*b* on device 102.

In some implementations, device 102 may comprise a player (e.g., an ABR streaming player) that has completed, during an installation or updating of an OS, building baseline power usages per codec (and codec profile) and the set of segment characteristics. The player may select, e.g., prior to or during presentation of requested content item 104*b*, one or more encoded video segment groups 112 based on baseline power usages associated with decoding and post decode processing the one or more encoded video segment groups and/or quality (e.g., objective and/or perceptual video quality) associated with (the set of segment characteristics comprised in) the one or more encoded video segment groups associated with requested content item 104*b*. In some implementations, the player may select, e.g., prior to or during presentation of requested content item 104*b*, a subset of encoded video segment groups 112 by determining, for each encoded video segment group 112 associated with requested content item 104*b*, which encoded video segment group 112 can be presented in its entirety based on a battery life of the device, and by selecting the encoded video segment group 112 of highest quality for presentation.

Figure 2:
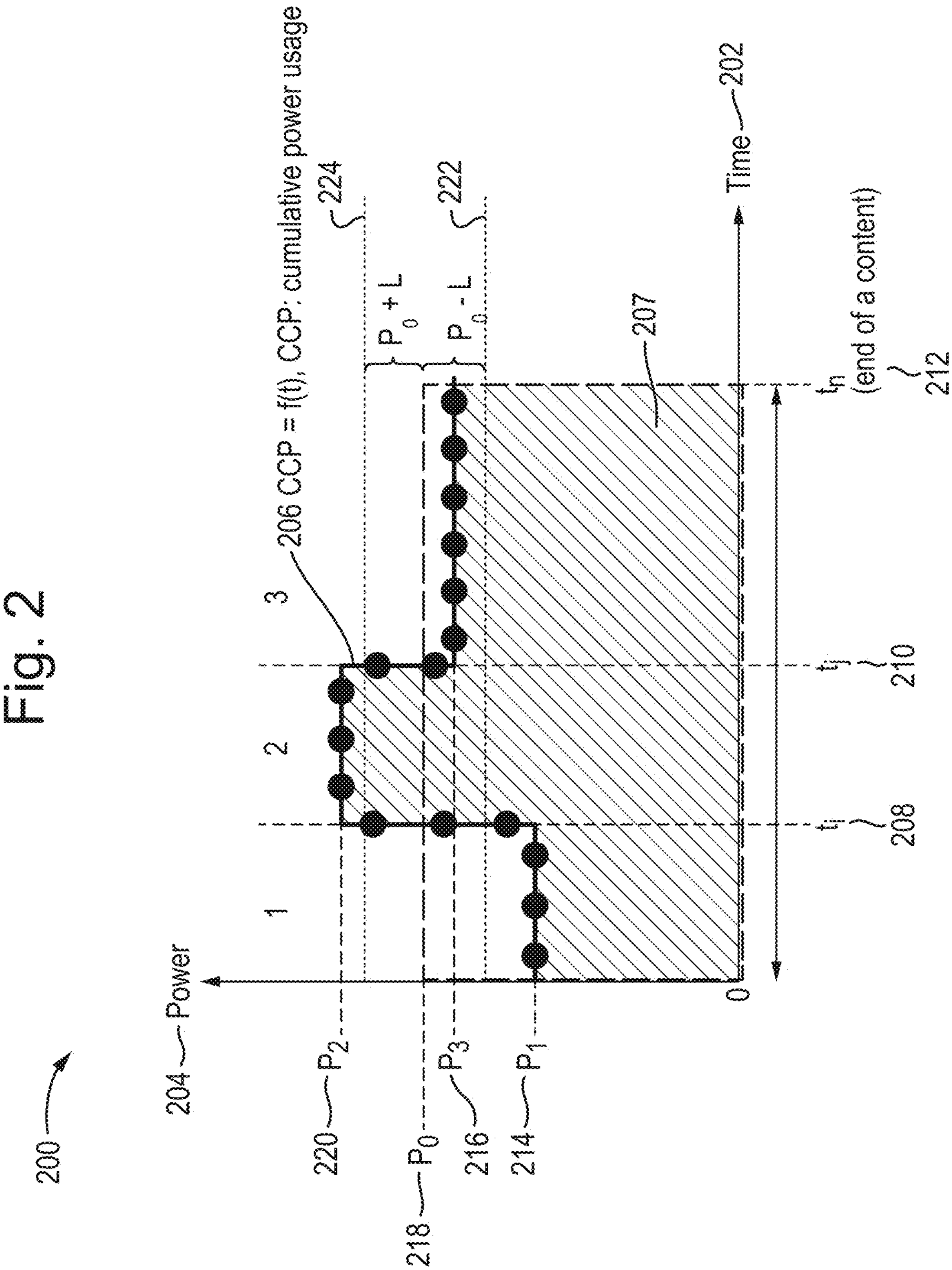
FIG. 2 represents an example for enabling the improved management of a device power resource during a presentation, on the device, of a content item, in accordance with some implementations of the disclosure.

FIG. 2 represents an example graph 200 for enabling the improved management of a device power resource during a presentation, on the device (associated with FIG. 2), of a content item, in accordance with some implementations of the disclosure. Example graph 200 shows how a player of the device selects, for presentation, a representation (e.g., an encoded segment group) among a set of representations associated with a content item selected for presentation. In some instances, at least a subset of the set of representations may be associated with a format tuple comprising a same codec (and codec profile). In some instances, at least a subset of the set of representations may be associated with a format tuple comprising a different codec (and codec profile).

In some implementations, the device may be subjected to the set of conditions pertinent to device 102. In some implementations, example graph 200 comprises an X-axis 202 representing time, a Y-axis 204 representing power, a curve 206 representing a cumulative power usage associated with all device processes running at any time point between 0 and a time '$t_n$' 212, a parallelogram 207 representing a baseline cumulative power usage associated with all device processes running at any time point between 0 and a time '$t_n$' 212, a first horizontal line 222 and a second horizontal line 224. A width and a height of parallelogram 207 are equal to time '$t_1$' 212 and a power value '$P_0$' 218, respectively. A device battery has, prior to the presentation of the encoded segment group selected among, e.g., a first encoded segment group, a second encoded segment group, and a third encoded segment group, a power value 'Pa' proportional to power value '$P_0$' 218 such that $Pa=k*P_0$ with k a constant above 1. The first horizontal line 222 and second horizontal line 224 are both at equal distance 'L' from the power value '$P_0$' 218.

From 0 to a time '$t_i$' 208, curve 206 is constant such that an ordinate of curve 206 has a power value '$P_1$' 214, located below first horizontal line 222. A player of a device presents a content item by presenting the first encoded segment group and determines that the presentation of the first encoded segment group uses less power than expected such that more power can be used to present the content item as a second encoded segment group whose quality level exceeds that of the first encoded segment group. The player determines to present the second encoded segment group from time '$t_i$' 208 to a time '$t_j$' 210.

From the time '$t_i$' 208 to time '$t_j$' 210, curve 206 is constant such that an ordinate of curve 206 has a power value '$P_2$' 220, located above second horizontal line 224. The player of the device determines that the presentation of the content item as the second encoded segment group uses more power than expected such that the cumulative power usage can be decreased by presenting the content item as a third encoded segment group whose quality level is below that of the second optimal encoded segment group but exceeds that of the first optimal encoded segment. The player determines to present the second encoded segment group from time '$t_j$' 210 to a time '$t_n$' 212.

From the time '$t_j$' 210 to time '$t_n$' 212, curve 206 is constant such that an ordinate of curve 206 has a power value '$P_3$' 216, located in between first horizontal line 222 and second horizontal line 224. The player of the device may determine that the presentation of the content item as the third encoded segment group uses less power than expected. However, the player determines that the power decrease is within a range [$P_0$−L; $P_0$+L], and maintains the third encoded segment group for presentation. When the cumulative power usage associated with all device processes running is located in between first horizontal line 222 and second horizontal line 224, the player does not switch to another encoded segment group for presentation and keeps presenting the same encoded segment group.

Figure 3:
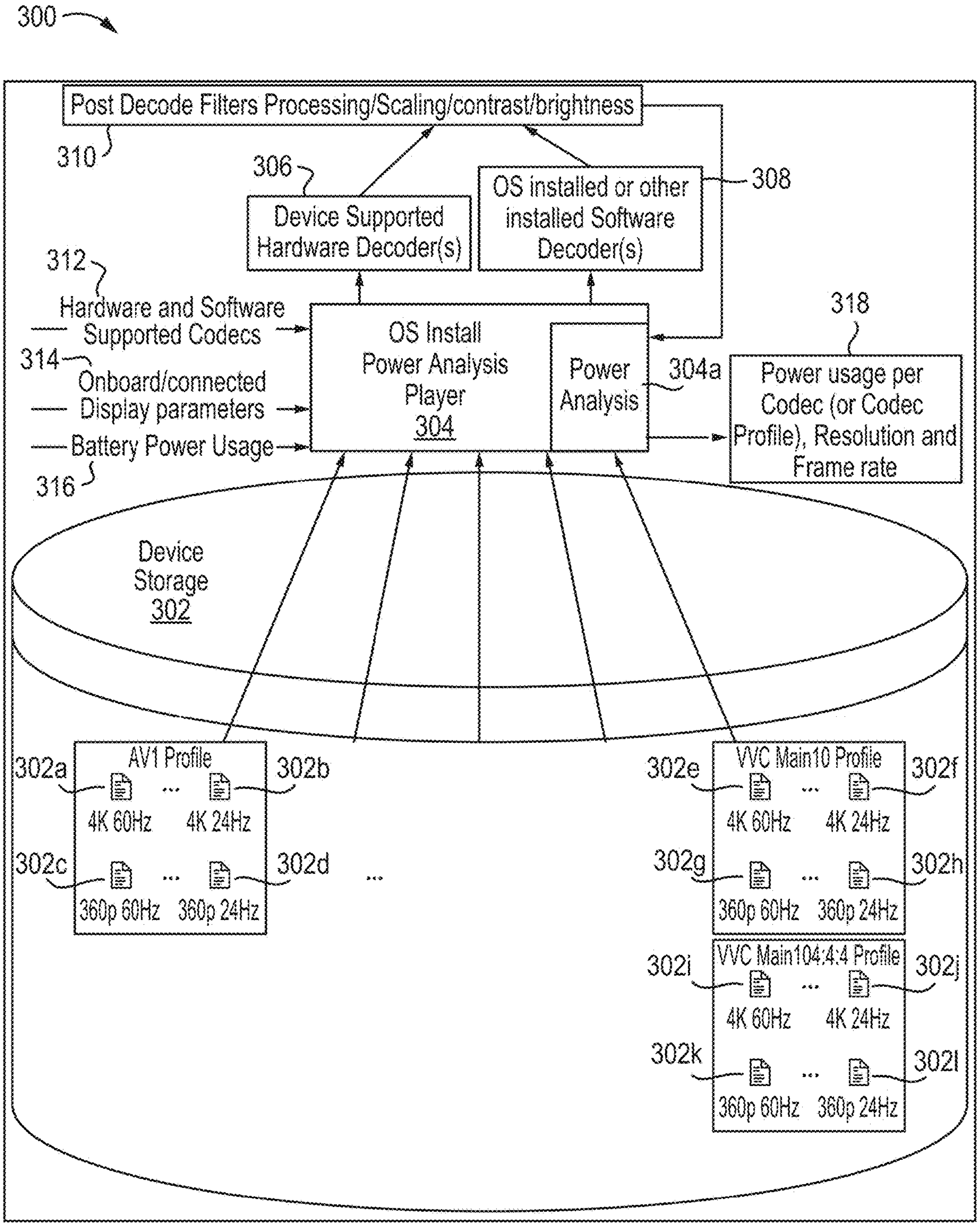
FIG. 3 depicts a system diagram of a example system for enabling the improved management of a device power resource during a presentation, on the device, of a content item, in accordance with some implementations of the disclosure.

FIG. 3 depicts an example device 300 for enabling the improved management of a device power resource during a presentation, on the device, of a content item, in accordance with some implementations of the disclosure.

In some implementations, the device may be subjected to the set of conditions pertinent to device 102. In some implementations, example device 300 comprises, e.g., a device storage 302, an OS install power analysis player 304, a power analysis component 304*a*, at least one device supported hardware decoder 306, at least one OS installed or other installed software decoder 308, and at least one post decode filters 310. OS install power analysis player 304 receives, from a device profile associated with the device, information related to e.g., hardware and software supported codecs 314, onboard/connected display parameters 314, and (battery) power usages 316 (each power usage measured when decoding an encoded segment group from a set of encoded segment groups associated with a test content item). OS install power analysis player 304 determines, for each encoded segment group associated with a respective format tuple, a baseline power usage associated with decoding the encoded segment group (e.g., a power usage from power usages 318 per codec (and codec profile), resolution and frame rate).

Device storage 302 comprises a portion of an OS image, e.g., a plurality of encoded files (such as encoded files 302*a*, 302*b*, 302*c*, 302*d*, 302*e*, 302*f*, 302*g*, 302*h*, 302*i*, 302*j*, 302*k*, 302*l*), each encoded file associated with a video clip (e.g., a same video clip). In some implementations, each encoded file may be uploaded into device storage 302 during the installation or updating of the OS on the device. Each encoded file corresponds to an encoded segment group associated with a respective format tuple comprising a codec (and codec profile), two segment characteristics (e.g., resolution, frame rate), each segment characteristic exhibiting a respective value selected among one or more available values. In some implementations, each encoded file may be categorized based on the respective codec profile used to generate the encoding file and in each category of encoded files, the encoded files are classified following a decreasing resolution from top to bottom and a decreasing frame rate from left to right. For instance, the encoded file 302*e* is encoded following versatile video coding (VVC or H.266) Main10 profile and presents a resolution of 4K and a frame rate of 60 Hz. For instance, the encoded file 302*h* is encoded following versatile video coding (VVC or H.266) Main10 profile and presents a resolution of 360p and a frame rate of 24 Hz. Other files may be encoded, for example, following VP9 profile 0, VP9 profile 2, AVC Base profile, AVC High profile, HEVC Main profile, HEVC Main10 profile and each other of files having a value for each segment characteristic selected among one or more available values.

During an installation of an OS on example device 300 or an updating of the OS installed on example device 300, example device 300 may perform power usage tests to determine what codecs (and codec profiles), resolutions and frame rates, drain the battery of example device 300, and at what rates. Each power usage associated with a codec profile may be dependent on, e.g., whether a decoding of short video segments using the codec profile is software- or hardware-accelerated, GPU usage based on hardware supported codecs, CPU usage based on software supported codecs, and post decode processing (e.g., upscaling or downscaling decoded frames to present at least a portion of each decoded frame on a display, controlling contrast and brightness of the display to modify the presentation of the decoded frames) in relation with display size. At the time of the OS installation or updating, example device 300 may, for each encoded short video, decode an encoded short video, determine a power usage associated with a decoding of the encoded short video, and associate the determined power usage with a codec profile used for generating and decoding the encoded short video. Example device 300 may then rank the multiple codec profiles based on associated power usages, e.g., from the most power-efficient codec profile to the least power efficient profile. Other encoded files (not shown in FIG. 3) are encoded following VP9 profile 0, VP9 profile 2, AVC base profile, AVC high profile, HEVC Main 10 profile, and HEVC Main 10 4:4:4 profile, each of the codecs (and codec profiles) having a distribution of resolutions and frame rates.

Once the OS image has been installed on a device, the device performs optimizations post image install before the device is usable by the user. This may or may not be indicated to the user through messages like "Optimizing . . . ." Or "Optimizing applications" however it is a typical practice for the device/OS provider to perform these types of post process optimizations. During the OS post install optimization phase, the device will use a special player that is specifically used for testing battery drain across each of the codecs and profiles. This will include leveraging all device hardware decoders and any installed software decoders on the device. For all codecs and profiles across all resolutions and framerates, the OS install Power Analysis player will play (decode and each included codec/profile file across each of the resolutions) where there is either hardware or software codec support. The native resolution for the device is also considered for the playout. For any codec/profile's resolution and framerate where upscaling or downscaling would be required, a proper scaling filter is also applied when computing the power requirements for decoding and rendering the video. During this process, "rendering" is not actually rendered to the display, it is sent to post processing (filtering) but not displayed on the device's physical display. Once the playout is complete for each codec/profile, resolution and framerate along with any post processing that is required based on the resolution and framerate; while monitoring power consumption, a power usage profile is generated for the codec/profile, resolution and framerate. This will allow a player to calculate how much power usage will be consumed for each codec/profile, resolution and framerate over a duration of time. Additionally, a brief test may also be performed where the OS install Power Analysis Player may play a video in full screen and apply no filter and additional post processing contrast and brightness filters and create additional profiles which consider the internal display screen power usage based on different brightness and contrast settings. This may provide a way for the player to adjust the brightness and contrast through post decode processing and increase the video playout time when on battery. In video playback, different adaptations may occur after decoding a bitstream. Besides down- and up-scaling, frame rate conversion is a common process. In the case of playing HDR content, additional processes such as combining multi-layer of video signals, dynamic range and color gamut adaptation to the display capability or settings, etc. The user's settings of screen refresh rate and brightness are important variables to consider in terms of both device power consumption and content adaptation.

Figure 4A:
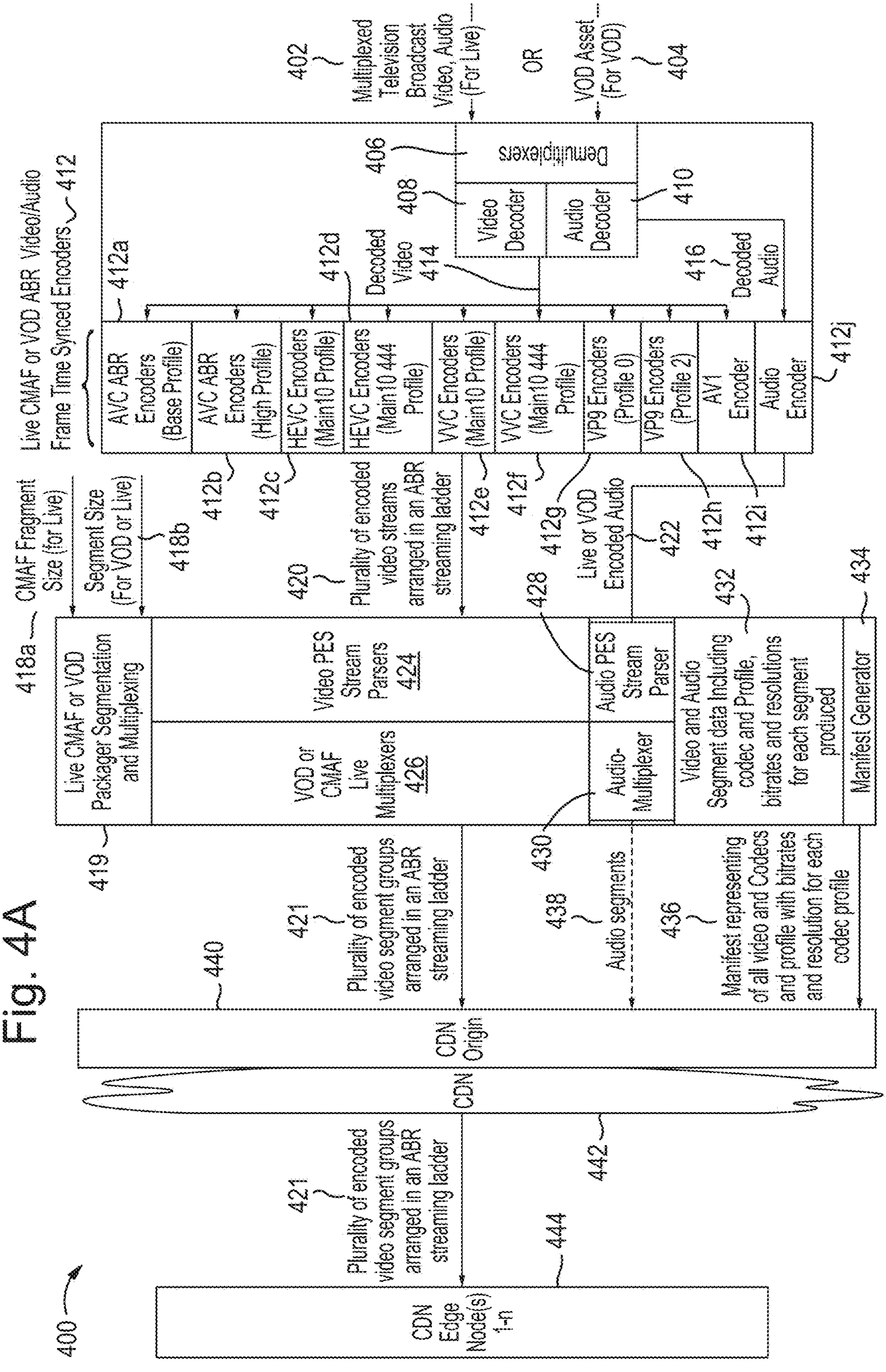
FIG. 4A illustrates an example for enabling the improved management of a device power resource during a presentation, on the device, of a content item, in accordance with some implementations of the disclosure.

FIG. 4A illustrates an example 400 for enabling the improved management of a device power resource during a presentation, on the device (e.g., device 102, example device 300, device 801 and devices associated with FIGS. 2, 5 to 7 and 9), of a content item, in accordance with some implementations of the disclosure. In some implementations, FIG. 4A discloses how multiple encoded segment groups associated with a content item may be generated and distributed from a content provider, via CDN origin and CDN edge node, to the device.

In some implementations, example 400 describes how content (e.g., live content 402 or recorded content 404) from a content provider is encoded into multiple encoded segment groups (each encoded segment group being associated with format tuple comprising a codec (and codec profile), and a set of segment characteristics selected among resolution, frame rate, pixel bit depth, and/or bitrate, each segment characteristic being set to a value selected among one or more available values) so as to be arranged in an ABR streaming ladder based on quality (e.g., objective and/or perceived video quality). In some instances, example 400 also depicts how a manifest (e.g., a manifest 436) associated with the content item is generated so as to list all encoded segment groups associated with the content item, and information (comprising, e.g., format tuple of each encoded segment group, etc.) related to the encoded segment groups. In some examples, example 400 also depicts how the content from the content provider is placed, after processing, as encoded segment groups in a content delivery network (CDN) edge node (e.g., CDN edge node 444), for efficient streaming, where buffering is minimized.

In some implementations, example 400 comprises a live content 402 (e.g., multiplexed live content such as multiplexed video and audio streams) or a recorded content 404 (e.g., a multiplexed recorded content such as multiplexed VOD content or multiplexed recorded live content), a demultiplexer 406, a video decoder 408, an audio decoder 410, audio/video frame time synced encoders 412 organized into encoder groups 412*a*-412*i*, a decoded video 414, a decoded audio 416, a common media application format (CMAF) fragment size 418*a* (for live content), a segment size 418*b*(for live or recorded content), a segmentation and multiplexing packager 419, a plurality 420 of encoded video streams arranged in an ABR streaming ladder (each encoded video stream associated with a format tuple, comprising a codec (and codec profile), and a set of segment characteristics, e.g., resolution, framerate and intended bitrate), a plurality 421 of encoded video segment groups arranged in an ABR streaming ladder (each encoded segment group associated with a format tuple, comprising a codec (and codec profile), and a set of segment characteristics, e.g., resolution, framerate and bitrate), an encoded audio 422 (for live or recorded content), a video packetized elementary stream (PES) parser 424, multiplexers 426 (e.g., live or recorded CMAF multiplexers), an audio PES stream parser 428, audio multiplexer 430, video 432*a* and audio 432*b* segment data 432, a manifest generator 434, a manifest 436, audio segments 438, a CDN origin 440, a CDN 442 and a CDN edge node 444. (CMAF is a multiplex format modification to MPEG 4 part 12 which allows an MP4 multiplexed file to have fragment markers inserted throughout the multiplexed file. A video encoder encodes the video stream and the encoded stream is sent to a packager which creates multiplexed segments at the desired segment lengths.)

In some implementations, the content (e.g., live content 402 or recorded content 404) from the content provider is processed by demultiplexers 406 so as to decompose a video-audio signal associated with the content into a video signal and an audio signal.

In some implementations, the video signal is decoded by video decoder 408 into a decoded video 414. Decoded video 414 is encoded, by each encoder of video encoder groups

Figure 4B:
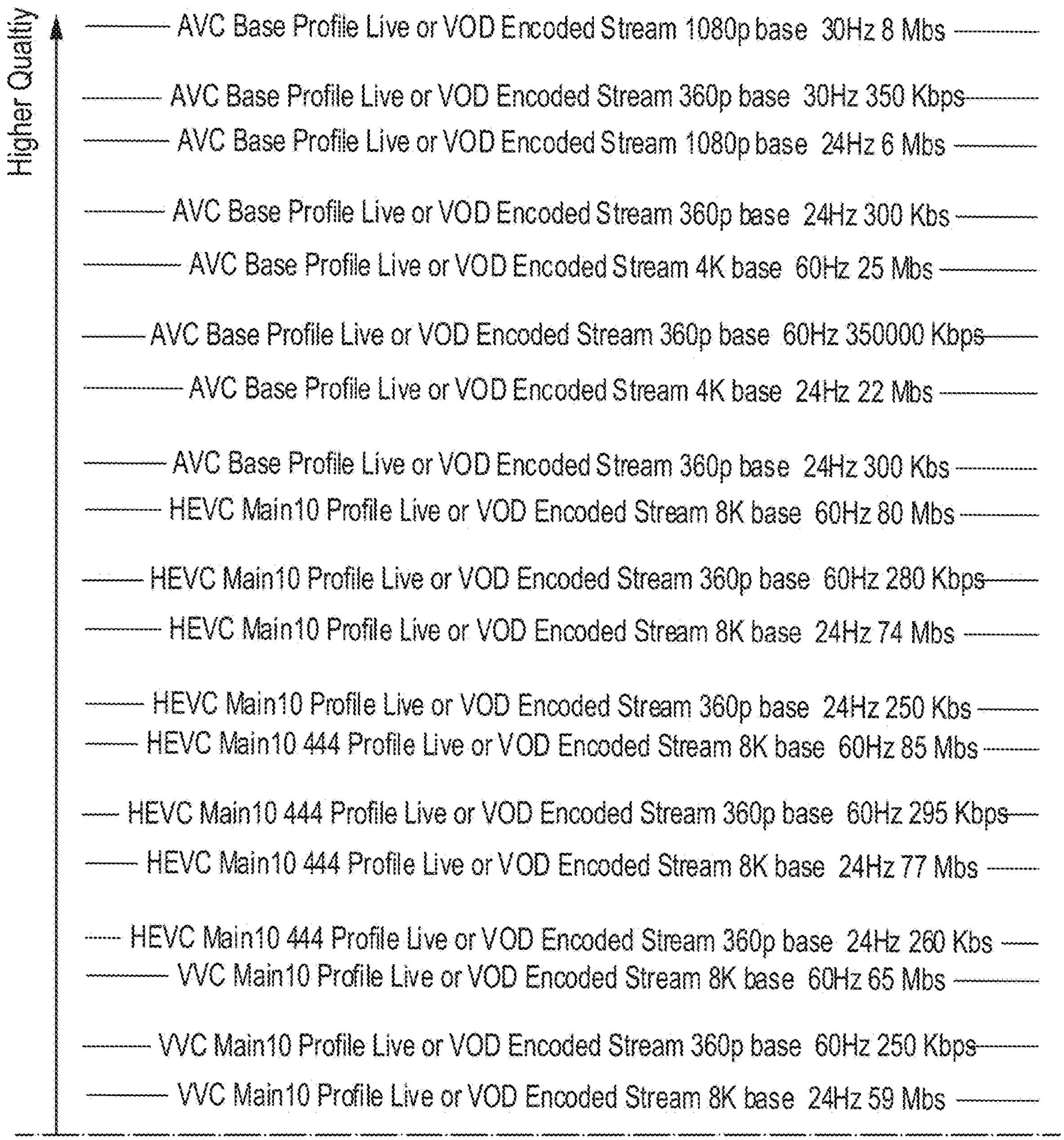
FIG. 4B illustrates a set of encoded video streams in an example for enabling the improved management of a device power resource during a presentation, on the device, of a content item, in accordance with some implementations of the disclosure.
Figure 4B:
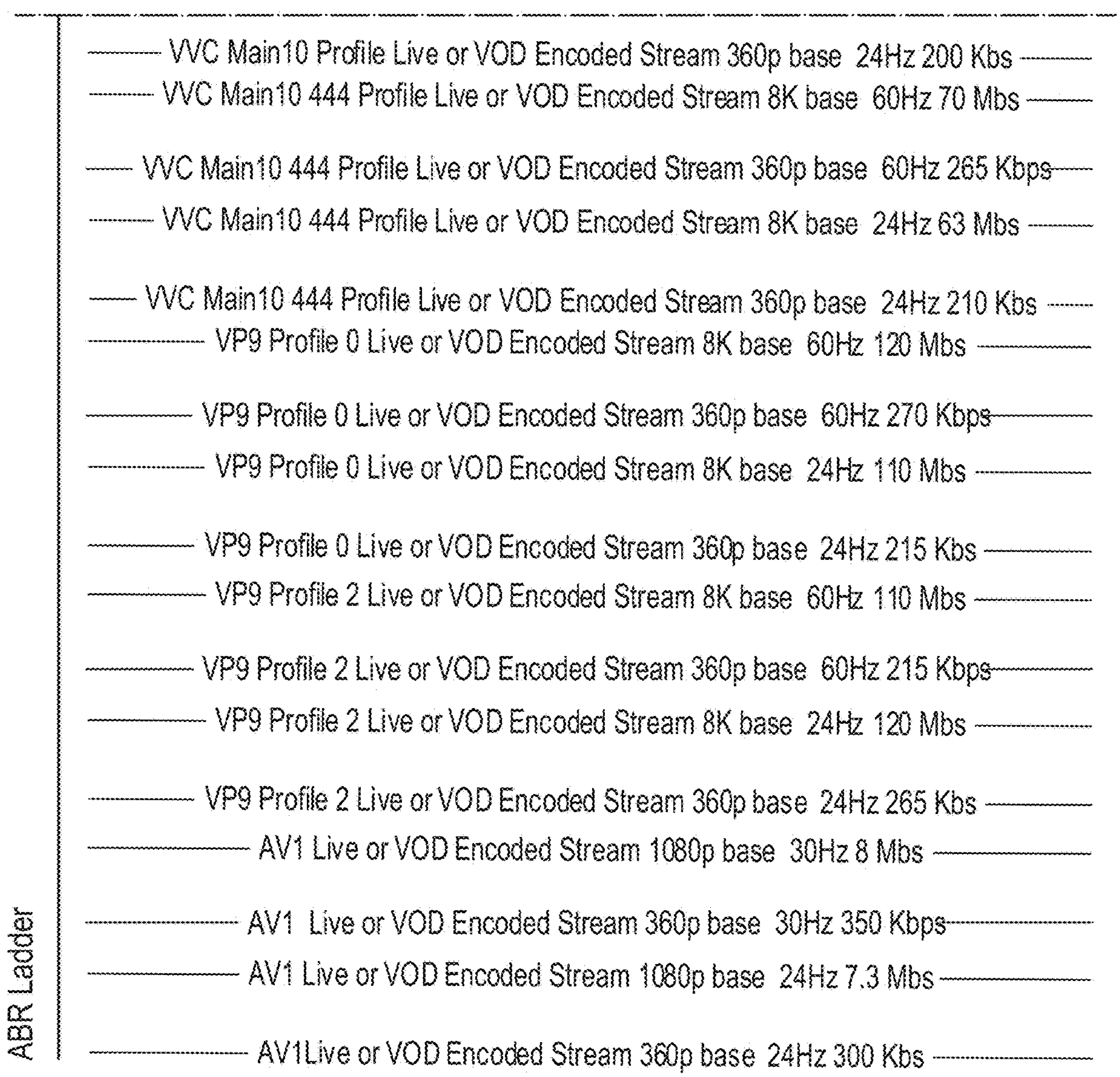

412*a*-412*h*, into plurality 420 of encoded video streams depicted in FIG. 4B. Each encoded video stream of plurality 420 of encoded video streams is, for example, associated with a format tuple, comprising a codec (and codec profile), and a set of segment characteristics, e.g., resolution, frame rate and intended bitrate into which an encoded video stream is to be segmented. Each encoded video stream of plurality 420 of encoded video streams is arranged in an ABR ladder, from the lowest quality to the highest quality (as depicted in FIG. 4B): AV1 encoded stream 360p base 24 Hz 300 Kbps, AV1 encoded stream 1080p base 24 Hz 7.3 Mbps, AV1 encoded stream 360p base 30 Hz 350 Kbps, AV1 encoded stream 1080p base 30 Hz 8 Mbps, VP9 profile 2 encoded stream 360p base 24 Hz 265 Kbps, VP9 profile 2 encoded stream 8K base 24 Hz 120 Mbps, VP9 profile 2 encoded stream 8K base 60 Hz 120 Mbps, VP9 profile 0 encoded stream 360p base 24 Hz 215 Kbps, VP9 profile 0 encoded stream 8K base 24 Hz 110 Mbps, VP9 profile 0 encoded stream 360p base 60 Hz 270 Kbps, VP9 profile 0 encoded stream 8K base 60 Hz 120 Mbps, VVC Main10 4:4:4 profile encoded stream 360p base 24 Hz 210 Kbps, VVC Main10 4:4:4 profile encoded stream 8k base 24 Hz 63 Mbps, VVC Main10 4:4:4 profile encoded stream 360p base 60 Hz 265 Kbps, VVC Main10 4:4:4 profile encoded stream 8K base 60 Hz 70 Mbps, VVC Main10 profile encoded stream 360p base 24 Hz 200 Kbps, VVC Main10 profile encoded stream 8K base 24 Hz 59 Mbps, VVC Main10 profile encoded stream 360p base 60 Hz 250 Kbps, VVC Main10 profile encoded stream 8K base 60 Hz 65 Mbps, HEVC Main10 4:4:4 profile encoded stream 360p base 24 Hz 260 Kbps, HEVC Main10 4:4:4 profile encoded stream 8K base 24 Hz 77 Mbps, HEVC Main10 4:4:4 profile encoded stream 360p base 60 Hz 295 Kbps, HEVC Main10 4:4:4 profile encoded stream 8K base 60 Hz 85 Mbps, HEVC Main10 profile encoded stream 360p base 24 Hz 250 Kbps, HEVC Main10 profile encoded stream 8K base 24 Hz 74 Mbps, HEVC Main10 profile encoded stream 360p base 60 Hz 280 Kbps, HEVC Main10 profile encoded stream 8K base 60 Hz 80 Mbps, HEVC Main10 profile encoded stream 360p base 60 Hz 280 Kbps, HEVC Main10 profile encoded stream 8K base 60 Hz 80 Mbps, AVC base profile encoded stream 360p base 24 Hz 300 Kbps, AVC base profile encoded stream 4K base 24 Hz 22 Mbps, AVC base profile encoded stream 360p base 60 Hz 350 Kbps, AVC base profile encoded stream 4K base 60 Hz 25 Mbps, AVC base profile encoded stream 360p base 24 Hz 300 Kbps, AVC base profile encoded stream 1080p base 24 Hz 6 Mbps, AVC base profile encoded stream 360p base 30 Hz 350 Kbps, AVC base profile encoded stream 1080p base 30 Hz 8 Mbps. Each encoded video stream of plurality 420 of encoded video streams may be segmented, by segmentation and multiplexing packager 419, at a size based on CMAF fragment size 418*a* (for live content or recorded live content) or segment size 418*b* (for live or recorded content), into a respective encoded video segment group. Each respective encoded video segment group may be comprised into plurality 421 of encoded video segment groups.

Figure 4C:
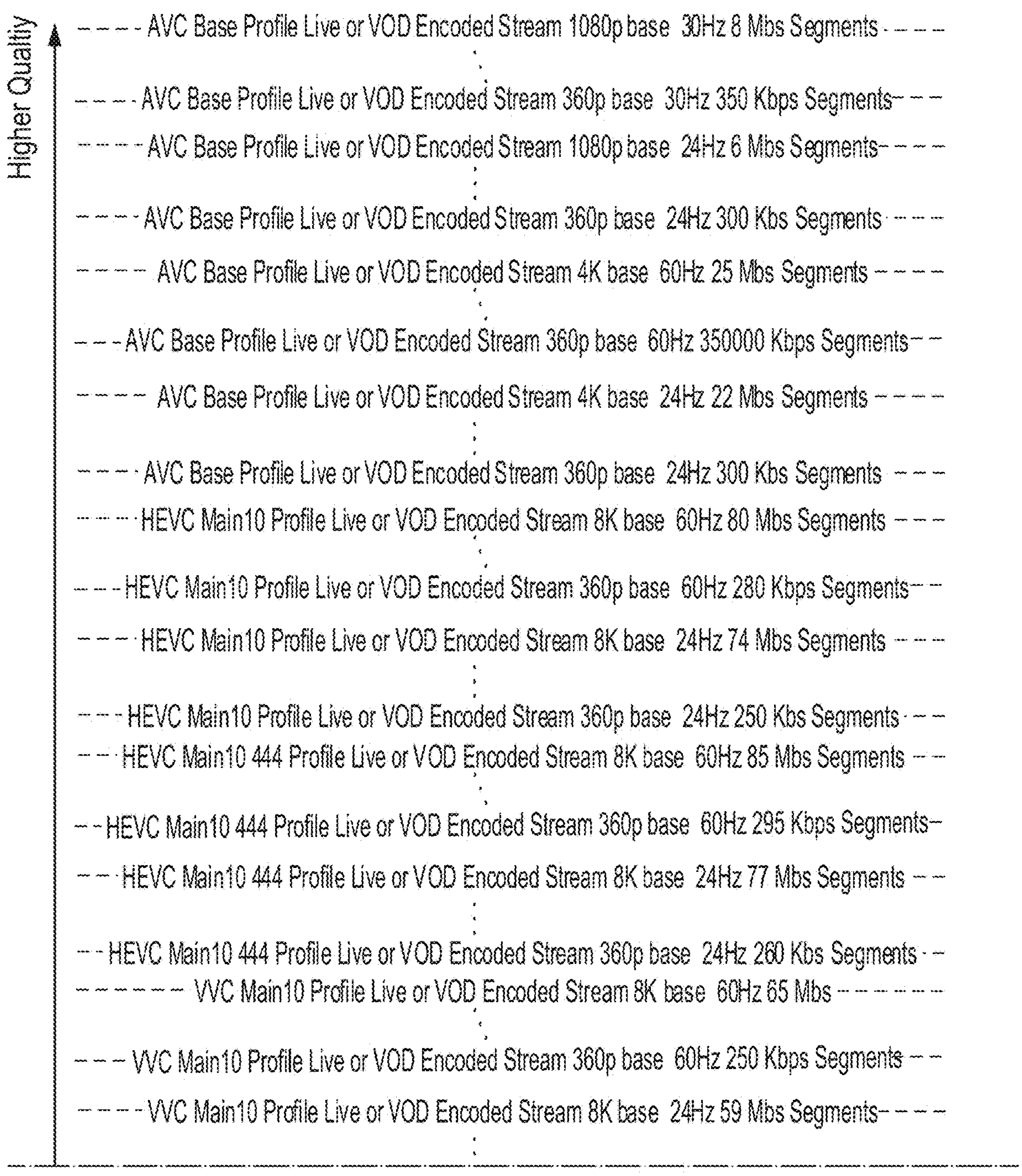
FIG. 4C illustrates a set of encoded video segment groups in an example for enabling the improved management of a device power resource during a presentation, on the device, of a content item, in accordance with some implementations of the disclosure.
Figure 4C:
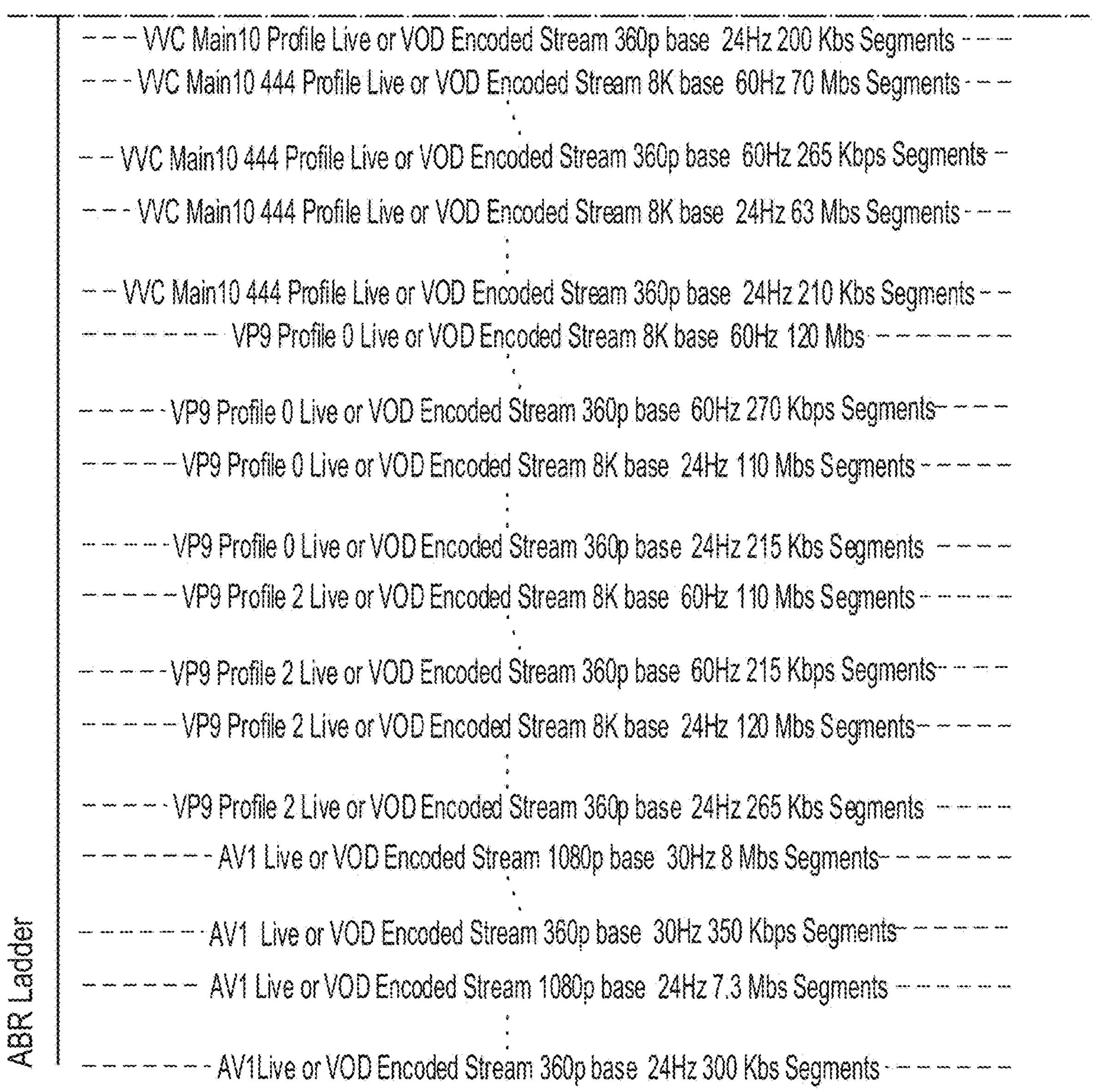

Each encoded video segment groups of plurality 421 of encoded video segment group may, for example, be associated with a format tuple, comprising a codec (and codec profile), and a set of segment characteristics, e.g., resolution, frame rate and bitrate. Each encoded video segment group of plurality 421 of encoded video segment groups is arranged in an ABR ladder, from the lowest quality to the highest quality (as depicted in FIG. 4C). ABR ladders represented in FIGS. 4B and 4C may be identical (or similar). In some instances, the encoded video streams of plurality 420 may be arranged, based on format tuples, in an order and at positions on a first ABR ladder, that may be identical (or similar) to an order and positions on a second ABR ladder on which the encoded video segment groups associated with the encoded video streams may be arranged.

In some implementations, plurality 421 of encoded video segment groups is processed by video PES stream parsers 424 to extract and interpret video data 432*a*. Video data 432*a* may be delivered to manifest generator 434 so as to incorporate video data 432*a* into manifest 436.

In some implementations, video data 432*a* comprises, for each video segment, e.g., position in a segment sequence corresponding to the content, time point range in a runtime of the content, location on a server, duration, codec (and codec profile) used for segment encoding, a set of segment characteristics (e.g., resolution, frame rate, and bitrate) and related values, metadata (e.g., content description), etc. In some implementations, manifest 436 may comprise, e.g., video data 432*a*, a runtime of the content item, etc. Video segments of each encoded video segment group of plurality 421 of encoded video segment groups is processed by video multiplexers 426 to multiplex the video segments into a single video output line so as to facilitate delivery of the segments via CDN 442 to the device. The single video output line is sent from a CDN origin 440 via CDN 442 to CDN edge node 444, which is connected to the device. In effect, plurality 421 of encoded video segment groups arranged on an ABR streaming ladder, e.g., from a lowest quality encoded video segment group to a highest quality encoded video segment group, is delivered via CDN 442 to the device.

In some implementations, the audio signal is decoded by audio decoder 410 into decoded audio 416. Decoded audio 416 is encoded, by each encoder from audio encoder group 412*i*, into an encoded audio 422 following an audio coding format. Encoded audio 422 is processed by audio PES stream parser 428 to extract and interpret audio data 432*b*. Audio data 432*b* is delivered to manifest generator 434 so as to incorporate audio data 432*b* into manifest 436. Encoded audio 422 is segmented into audio segments. Audio segments is processed by audio multiplexer 430 into a single audio output line so as to facilitate delivery of the audio segments via CDN 442 to the device. The single audio output line is sent from a CDN origin 440 via CDN 442 to CDN edge node 444, which is connected to the device.

Figure 5:
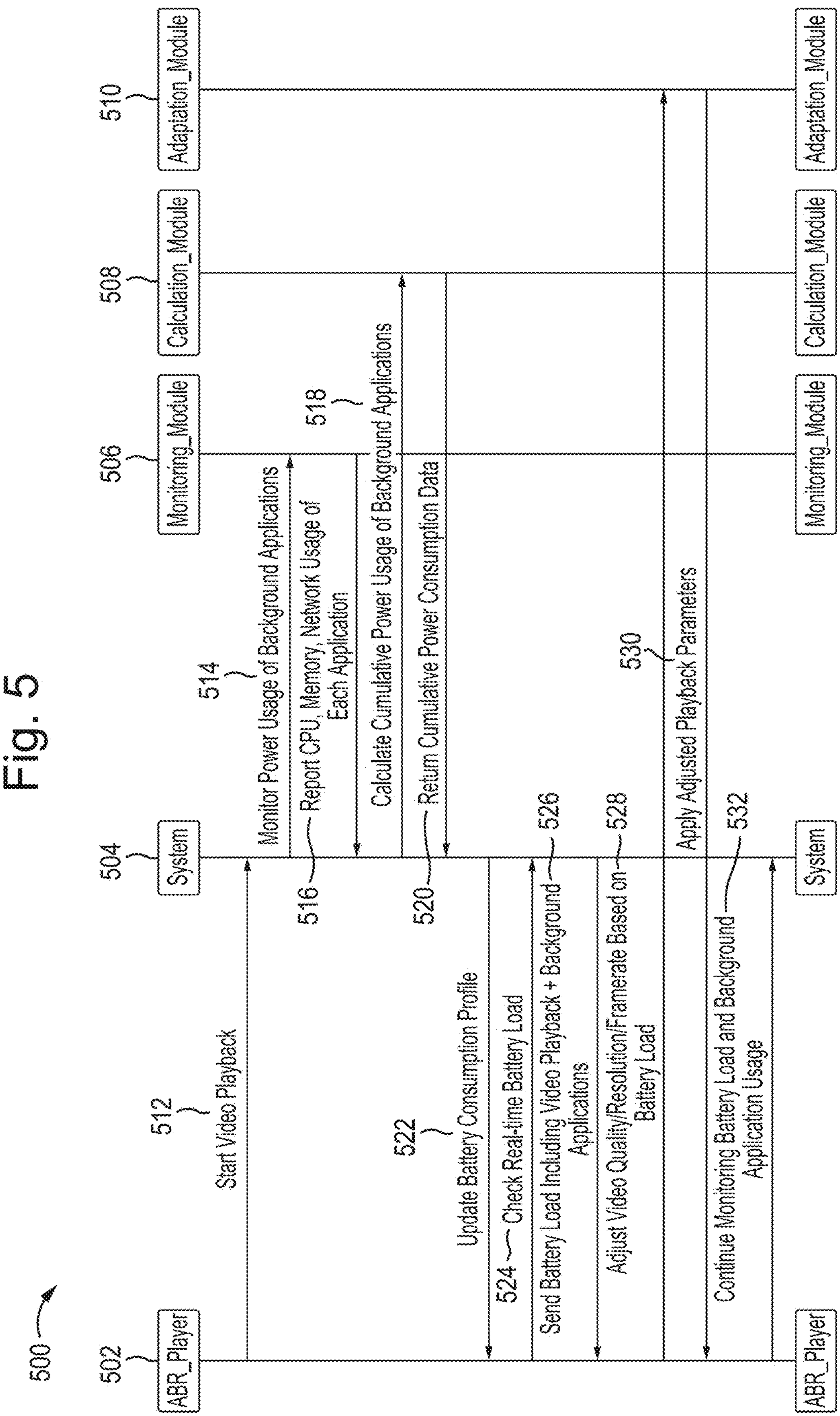
FIG. 5 shows a flow diagram of illustrative steps involved in the improved management of a device power resource during a presentation, on the device, of a content item, in accordance with some implementations of the disclosure.

FIG. 5 depicts a flow diagram 500 of illustrative steps involved in the improved management of a device power resource during a presentation, on the device (associated with FIG. 5), of a content item, in accordance with some implementations of the disclosure.

In some implementations, the device may be subjected to the set of conditions pertinent to device 102. In some implementations, the device may comprise a player 502 (e.g., ABR streaming player) and a system 504 (e.g., a power meter) determining (e.g., in real time or near real time) a cumulative power usage, e.g., associated with all device processes running on the device at a time point. In some implementations, the cumulative power usage (associated with all device processes running on the device at a time point) may correspond to a battery load, an amount of power consumed by the device at a given time point. In some implementations, system 504 may comprise a monitoring module 506, a calculation module 508 and an adaptation module 510. The device is to present the content item to a user. The device is not plugged to an external power source, enabling a discharging status for the device.

At step 512, player 502 may start presentation of the content item by requesting encoded segments (from an encoded segment group) associated with the content item, using the manifest file. This may send, to system 504, a notification specifying that at a time point posterior to the issuance of the notification, the cumulative power usage (associated with all device processes running on the device at a time point) may comprise a power usage associated with presentation, on the device, of the requested segments associated the content item.

At step 514, system 504 may request monitoring module 506 to determine (e.g., in real time or near real time), for each background application, a power usage associated with the background application.

At step 516, monitoring module 506 may report, to system 504, for each background application, the power usage associated with the background application. In some implementations, monitoring module 506 may send, to system 504, power usage data and rank the background applications based on power usage data, e.g., from the most power consuming background application to the lowest power consuming background application. In some implementations, for each background application, the power usage associated with the background application may comprise power usages related to CPU, GPU, memory, display and/or network usages associated with the background application.

At step 518, system 504 may request calculation module 508 to determine (e.g., in real time or near real time) the cumulative power usage (associated with all device processes running on the device at a time point) comprising, e.g., the power usage(s) associated with the background application(s).

At step 520, calculation module 508 may return, to system 504, cumulative power usage data.

At step 522, system 504 may send, to player 502, the cumulative power usage data.

At step 524, player 502 may request system 504 to determine (e.g., in real time or near real time) the cumulative power usage comprising the power usage(s) with the background application(s) and the power usage associated with the presentation of the requested segments associated with one or more encoded segment groups on the device. In some instances, the power usage associated with the presentation of the requested segments may comprise power usage associated with CPU, GPU, memory, display, and/or network usages related to the presentation of the requested segments.

At step 526, system 504 may send, to player 502, cumulative power usage data.

At step 528, based on the cumulative power usage data, player 502 may adjust presentation parameters based on the cumulative power usage (associated with all device processes running on the device at a time point). In some implementations, player 502 may request adaptation module 510 to select, from the one or more encoded segment groups, for each portion of the duration of the presentation of the content item on the device, which encoded segment group (associated with a respective format tuple) the segments requested for presentation may belong to, so as to minimize or lower a quality distortion metric associated with the requested segments. This may increase the quality, perceived by a user consuming the content item, associated with the presentation of the requested segments (after demultiplexing, decoding, post decode processing, and rendering the requested segments). In some implementations, player 502 may request adaptation module 510 to select, from the one or more encoded segment groups, for each portion of the duration of the presentation of the content item on the device, which encoded segment group the segments requested for presentation may belong to, so as to minimize or lower a power usage associated with presentation of the requested segments (after demultiplexing, decoding, post decode processing and rendering the requested segments). This may thus decrease the cumulative power usage associated with all device processes running on the device at a time point. In some implementations, player 502 may request adaptation module 510 to select, from the one or more encoded segment groups, for each portion of the duration of the presentation of the content item on the device, which encoded segment group the segments requested for presentation may belong to, so as to maximize or increase a ratio of an inverse of a quality distortion metric to a power usage. In some instances, the ratio may be associated with the presentation of the requested segments. In some instances, the ratio may be a ratio of inverse of the quality distortion metric associated with the requested segments to the cumulative power usage associated with all device processes running on the device at a time point. This may ensure to balance quality and power usage associated with the presentation of the requested segments.

At step 530, adaption module 510 may request player 502 to apply recommendations (e.g., present segments of recommended representations associated with respective format tuples, each comprising a codec (and coded profile), and segment characteristics selected among, e.g., resolution, frame rate, pixel bit depth, and/or bitrate, and each segment characteristic being set to a value selected among one or more available values) so as to optimize the quality and/or the power usage associated with the presentation of the requested new segments.

At step 532, player 502 may request system 504 to keep determining (e.g., in real time or near real time) the cumulative usage power.

In some implementations, battery usage of applications actively running in the background during ABR video playback is considered. In this embodiment, the system monitors and estimates power consumption associated with each background application process and incorporates this data into the overall battery consumption calculation. The device utilizes real-time monitoring of CPU, memory, and network resources that each background application consumes, assigning a cumulative power usage value to these activities. This may allow the ABR player to dynamically adjust the selection and request of video segments for appropriate video quality, resolution, or framerate based on the additional power drain from active background processes. In practice, this embodiment enables the ABR player to adjust to varying battery loads by factoring in both video playback energy consumption and the battery impact of concurrent applications. This adjustment helps achieve optimal video playback quality and duration by balancing ABR parameters with the real-time cumulative power usage profile of the device, potentially lowering resolution or reducing framerate when background applications are consuming significant power.

Figure 6:
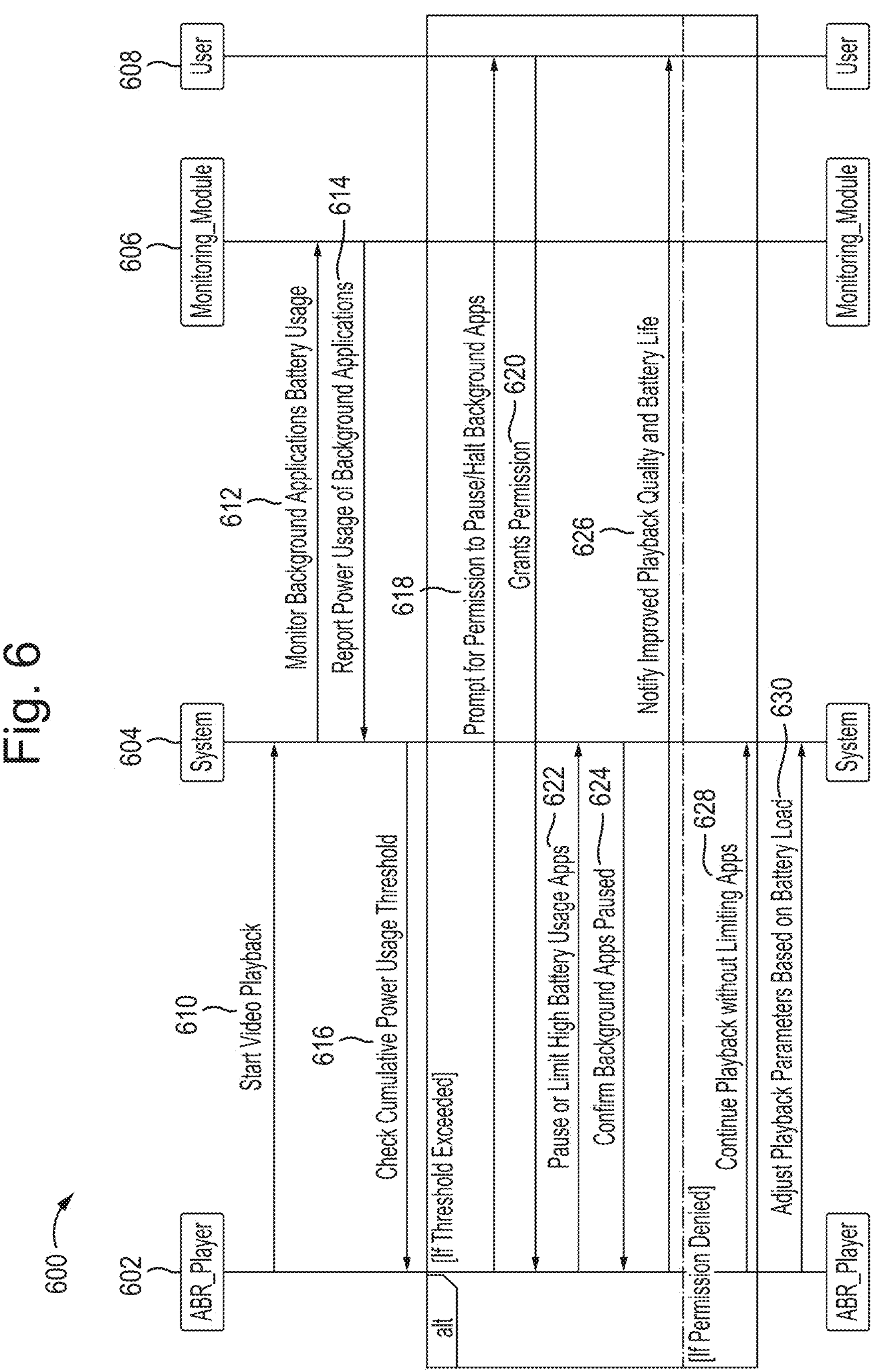
FIG. 6 represents a flow diagram of illustrative steps involved in the improved management of a device power resource during a presentation, on the device, of a content item, in accordance with some implementations of the disclosure.

FIG. 6 depicts a flow diagram 600 of illustrative steps involved in the improved management of a device power resource during a presentation, on the device, of a content item, in accordance with some implementations of the disclosure.

In some implementations, the device associated with FIG. 6 may be subjected to the set of conditions pertinent to device 102. In some implementations, the device may comprise a player 602 (for example, ABR streaming player) and a system 604 (for example, a power meter) determining in real a cumulative power usage, e.g., associated with all device processes running on the device at a time point. In some implementations, the cumulative power usage (associated with all device processes running on the device at a time point) may correspond to a battery load, an amount of power consumed by the device at a given time point. In some implementations, system 604 may comprise a monitoring module 606. The device may present the content item to a user 608. The device is not plugged to an external power source, enabling a discharging status for the device.

At step 610, player 602 may start presentation of the content item by requesting encoded segments (from an encoded segment group) associated with the content item, using the manifest file. This may send, to system 604, a notification specifying that at a time point posterior to the issuance of the notification, the cumulative power usage (associated with all device processes running on the device at a time point) may comprise a power usage associated with presentation of the requested segments on the device.

At step 612, system 604 may request monitoring module 606 to determine (e.g., in real time or near real time), for each background application, a power usage associated with the background application.

At step 614, monitoring module 606 may report, to system 604, for each background application, the power usage associated with the background application. In some implementations, monitoring module 606 may send, to system 604, power usage data and rank the background applications based on power usage data, e.g., from the most power consuming background application to the lowest power consuming background application. In some implementations, for each background application, the power usage associated with the background application may comprise power usage related to CPU, GPU, memory, display and/or network usages associated with the background application.

At step 616, system 604 may determine (e.g., in real time or near real time) the cumulative power usage comprising, e.g., the power usages associated with the background applications and the power usage associated with the presentation of the requested segments on the device. In some implementations, system 604 may set, automatically or via a user interface input, a threshold cumulative power usage. In some instances, the threshold cumulative power usage may comprise a percentage of the cumulative power usage associated with all device processes running on the device at a time point. In some implementations, system 604 may determine whether the cumulative power usage exceeds the threshold cumulative power usage. If the cumulative power usage exceeds the threshold cumulative power usage, system 604 may request player 602 to proceed to step 618. If not, system 604 may not modify, for each background application, how a background application is run by system 604.

At step 618, player 602 may prompt user 608 for permission to limit, pause/halt or stop, one or more background applications, by presenting a notification (e.g., textual, visual and/or audio notification) to user 608, in order for the cumulative power usage to become equal to or lower than the threshold cumulative power usage. This may allow for increasing a quality associated with the presentation of the content item and/or a battery life. In some implementations, system 604 may select the one or more background applications based on power usage associated with each of the one or more background applications, e.g., a high or higher power usage associated with each of the one or more background applications. If user 608 grants permission to player 602, player 602 proceeds to step 620. If not, player 602 proceeds to step 628.

At step 620, user 608 may grant permission, via a user interface input (e.g., voice command, tactile input), to player 602 to limit, pause/halt or stop the one or more background applications.

At step 622, player 602 may request system 604 to limit, pause/halt or stop the one or more background applications.

At step 624, system 604 may send, to player 602, a notification (e.g., visual and/or audio notification) to confirm that the one or more background applications have been limited, paused/halted or stopped.

At step 626, player 602 may present, to user 608, a notification (e.g., visual and/or audio notification) specifying that quality associated with the presentation of the content item and/or a battery life have been extended.

At step 628, player 602 may continue presenting the content item without limiting, pausing/halting or stopping the one or more background applications.

At step 630, player 602 may adjust presentation parameters based on the cumulative power usage (associated with all device processes running on the device at a time point) if the cumulative power usage exceeds the threshold cumulative power usage even though the one or more background applications have been limited, paused/halted or stopped. In some implementations, player 602 may from the one or more encoded segment groups, for each portion of the duration of the presentation of the content item on the device, which encoded segment group (associated with a respective format tuple) the segments requested for presentation may belong to, so as to (1) minimize/lower a quality distortion metric associated with the requested segments, or a power usage associated with presentation of the requested segments or (2) maximize/increase a ratio of the inverse of a quality distortion metric associated with the requested segments to a power usage associated with the presentation of the requested segments. The numberings (1) and (2) are to emphasize possible options and do not indicate a preferential order. In some implementations, player 602 may from the one or more encoded segment groups, for each portion of the duration of the presentation of the content item on the device, which encoded segment group (associated with a respective format tuple) the segments requested for presentation may belong to, so as to (1) minimize/lower a quality distortion metric associated with the requested segments, or the cumulative power usage associated with all device processes running on the device at a time point or (2) maximize/increase a ratio of the inverse of a quality distortion metric associated with the requested segments to the cumulative power usage associated with all device processes running on the device at a time point. The numberings (1) and (2)) are to emphasize possible options and do not indicate a preferential order.

In some implementations, users are prompted for permission to limit, pause/halt or stop background applications that exceed a specified battery usage threshold during video playback. In this embodiment, the ABR player monitors the battery consumption of background applications and identifies those with significant power demands. When the cumulative power usage of these applications surpasses a preset threshold—impacting the device's ability to sustain optimal video playback—the system prompts the user to allow the player application to temporarily suspend or limit these background processes. Upon receiving user consent, the ABR player then dynamically pauses or restricts specific background applications, thereby conserving battery power and enabling a higher quality or extended video playback experience. The system may further notify the user of expected improvements in playback quality or duration because of limiting background applications, ensuring that the user remains informed of potential battery life benefits achieved by selectively halting non-essential processes. This may thus enhance the device's battery efficiency during ABR playback by managing resource allocation based on user-approved priority adjustments.

Figure 7:
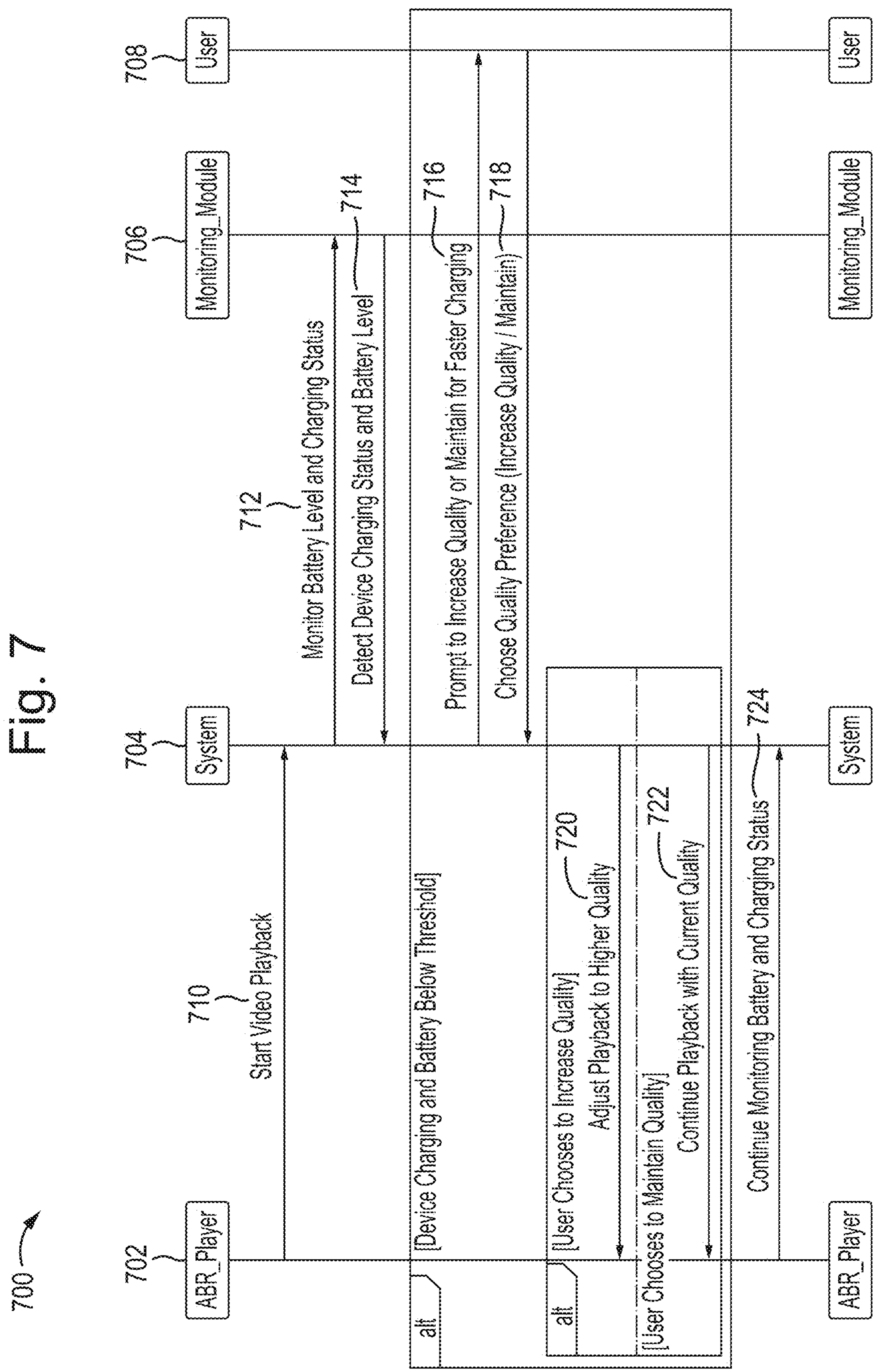
FIG. 7 depicts a flow diagram of illustrative steps involved in the improved management of a device power resource during a presentation, on the device, of a content item, in accordance with some implementations of the disclosure.

FIG. 7 depicts a flow diagram 700 of illustrative steps involved in the improved management of a device power resource during a presentation, on the device (associated with FIG. 7), of a content item, in accordance with some implementations of the disclosure.

In some implementations, the device may be subjected to the set of conditions pertinent to device 102. In some implementations, the device may comprise a player 702 (for example, ABR streaming player) and a system 704 (for example, a power meter) determining (e.g., in real time or near real time) a cumulative power usage with all device processes running on the device at a time point. In some implementations, the cumulative power usage (associated with all device processes running on the device at a time point) may correspond to a battery load, an amount of power consumed by the device at a given time point. System 704 may comprise a monitoring module 706. The device may present the content item to a user 708. The device is plugged to an external power source to charge the device battery, enabling a charging status for the device. The device battery has a level that evolves essentially based on the cumulative power usage and the charging status.

At step 710, player 702 may start presentation of the content item by requesting encoded segments (from an encoded segment group associated with a respective format tuple) associated with the content item, using the manifest file. This may send, to system 704, a notification specifying that at a time point posterior to the issuance of the notification, the cumulative power usage (associated with all device processes running on the device at a time point) may comprise a power usage associated with presentation of the requested segments on the device.

At step 712, system 704 may request monitoring module 706 to determine (e.g., in real time or near real time) the battery level and whether the charging status for the device is enabled.

At step 714, monitoring module 706 may determine (e.g., in real time or near real time) the battery level and whether the charging status for the device is enabled.

At step 716, system 704 may prompt user 708 for permission, by presenting a notification (e.g., textual, visual and/or audio notification), to (1) increase quality (e.g., video quality, objective and/or perceived video quality, or perceived quality based on inverse of quality distortion metric) associated with the requested segments, that may require increasing the cumulative power usage (associated with all device processes running on the device at a time point), or (2) maintain a faster charging of the device battery, for example, by maintaining the quality associated with the requested segments, that may maintain the cumulative power usage (associated with all device processes running on the device at a time point). The numberings (1) and (2) are to emphasize possible options and do not indicate a preferential order.

At step 718, user 708 may select, via a user interface input (e.g., voice command, tactile input), permission to increase the quality associated with the requested segments or maintain the faster charging of the device battery.

At step 720, user 708 may grant permission, via a user interface input (e.g., voice command, tactile input), to player 702, to increase the quality associated with the requested segments.

At step 722, user 708 user 708 may grant permission, via a user interface input (e.g., voice command, tactile input), to player 702, to maintain the faster charging of the device battery.

At step 724, player 724 may continue determining (e.g., in real time or near real time) the battery level and whether the charging status for the device is enabled.

In some implementations, the system detects when the device has begun charging while the battery level is below a specified threshold and prompts the user to select either an increase in video quality or to maintain the current playback settings to optimize battery charging. In such implementations, the ABR player actively monitors the device's battery level and charging status. When charging is detected and the battery level is under the threshold, the system prompts the user, offering an option to either enhance the video quality for a better viewing experience or to maintain the current quality level to facilitate faster battery charging. Upon receiving the user's choice, the ABR player dynamically adjusts the video quality according to the selected option. If the user opts to increase quality, the player will raise the resolution or framerate as supported by the current network and device capabilities. Conversely, if the user chooses to maintain quality for efficient charging, the ABR player continues playback at the existing settings without increasing power usage.

Figure 8:
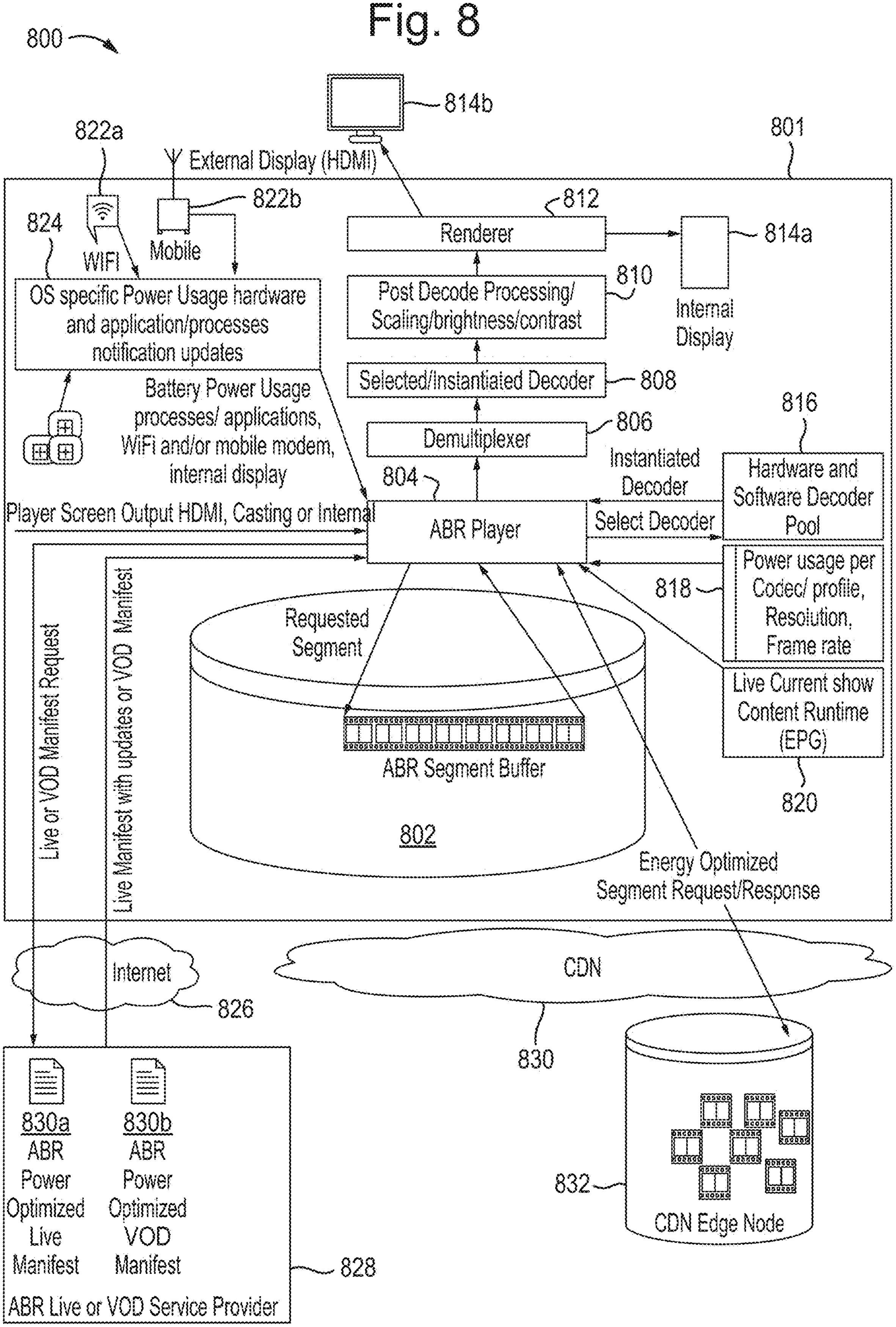
FIG. 8 illustrates a system diagram of a example system for enabling the improved management of a device power resource during a presentation, on the device, of a content item, in accordance with some implementations of the disclosure.

FIG. 8 depicts a system diagram of an example system 800 for enabling the improved management of a device 801 power resource during a presentation, on the device 801, of a content item, in accordance with some implementations of the disclosure.

In some implementations, device 801 may be subjected to the set of conditions pertinent to device 102. In some implementations, device 801 comprises a buffer 802 (e.g., ABR segment buffer), a player 804 (e.g., an ABR streaming player), a demultiplexer 806, one or more decoders 808 (e.g., audio decoder, video decoder), one or more post decode processing filters 810, a renderer 812, an internal display 814*a*, an external display 814*b*, a hardware and software decoder pool 816 to decode requested encoded segments, baseline power usages 818 (per encoded segment group), a Wi-Fi 822*a* or mobile 822*b* modem configured to receive or transfer data via a Wi-Fi or mobile communication network, and an OS specific power usage hardware 824. Device 801 is in communication with a content provider 828 (e.g., ABR live or VOD service provider) via internet 826. Additionally, device 801 is in communication with a content delivery network (CDN) edge node 832 via a CDN 830.

In some instances, player 804 requests, from content provider 828, a content item (e.g., a live or recorded content). Content provider 828 sends, to player 802, a manifest file 830*a*, 830*b* associated with the content item. Using manifest file 830*a*, 830*b*, player 804 requests, from CDN edge node 832, segments associated with the content item. The requested segments is encoded following a codec or at least a part of a codec (e.g., codec profile) into a lower amount of data (compressed data) easier to transfer to player 804. CDN edge node 832 delivers, to player 804, the requested segments as compressed data and stored in buffer 802, which may optimize latency (e.g., duration between presentation of two consecutive sets of requested segments) and energy consumed to transfer the requested segments. The data transfer is performed via Wi-Fi communication network 822*a* or a mobile communication network 822*b*. Demultiplexer 806 demultiplexes the requested segments into audio data and image data. Audio data is decoded by an audio decoder of the one or more decoders 808 into a plurality of audio track portions while image data is decoded by an image decoder of the one or more decoders 808 into a plurality of consecutive frames.

The plurality of consecutive frames is then subjected to one or more post decode processing filters 810 (e.g., to upscale, downscale or maintain scaling; to control brightness and contrast; to set refresh rate, etc.). The plurality of consecutive frames are subsequently processed by renderer 812 to be rendered on internal display 814*a* or external display 814*b*. If rendered on external display 814*b*, the plurality of frames is cast, using Wi-Fi 822*a* or mobile 822*b* communication network, onto external display 814*b* or transferred via wired connection (e.g., HDMI) to external display 814*b*. The plurality of audio track portions are processed to be presented via speakers, e.g., integrated within device 801 or external display 814*b*.

In some implementations, Wi-Fi 822*a* or mobile 822*b* modem is connected to OS specific power usage hardware 824, which receives (e.g., periodically or at a time point following prompting by a user interface input) application/process notification updates from an OS provider. In some implementations, OS specific power usage hardware 824 determines, during an installation or updating of the OS, the baseline power usages 818 associated with presentation of a video clip, e.g., baseline power usages associated with buffering, demultiplexing, decoding, post decode processing and/or rendering of requested segments associated with the video clip. The video clip may be encoded across one or more codecs (and codec profiles), and a set of segment characteristics, e.g., resolution and frame rate, and is uploaded during the installation or updating of an OS. In some implementations, the baseline power usage associated with the decoding of encoded segments associated with the video clip may depend upon the one or more codecs (and codec profiles) used for encoding the segments, the resolution and the frame rate, of the encoded segments. In some implementations, OS specific power usage hardware 824 sends, to player 804, the baseline power usage 818. In some implementations, OS specific power usage hardware 824 determines (e.g., in real time or near real time) and sends, to player 804, a cumulative power usage associated with device 801 comprising power usages associated with, e.g., background applications and presentation of the requested segments associated with the requested content item.

In some implementations, player 804 accesses a runtime 820 of the requested content item via an EPG if the content item is a live content item. In some implementations, if the requested content item is a live content item for which viewing is enabled, a term 'timeShiftBufferDepth' from the dynamic adaptive streaming over HTTP (DASH) manifest provides a time for the duration of the live content item. For instance, a 30 minute live content item that is time shifted may have a 'timeShiftBufferDepth' parameter equal to "PT30M", indicating that a runtime of the live content item is 30 minutes long in total. If the live content item started being broadcast at a first time point before being presented on device 801 at a second time point up to a third time point corresponding to the end of the live content item, the remaining duration of the live content item from the second time point to the third time point can be determined leveraging a current time from device 801, and a 'availabilityStartTime' parameter and a 'timeShiftBufferDepth' parameter from the DASH manifest.

In some implementations, player 804 may access a runtime 820 of the requested content item via a manifest (e.g., VOD manifest, VOD manifest file, manifest or manifest file of a recorded live content) if the requested content item is a recorded content item. Runtime 820 may be determined using a 'mediaPresentationDuration' parameter in the manifest.

Figure 9:
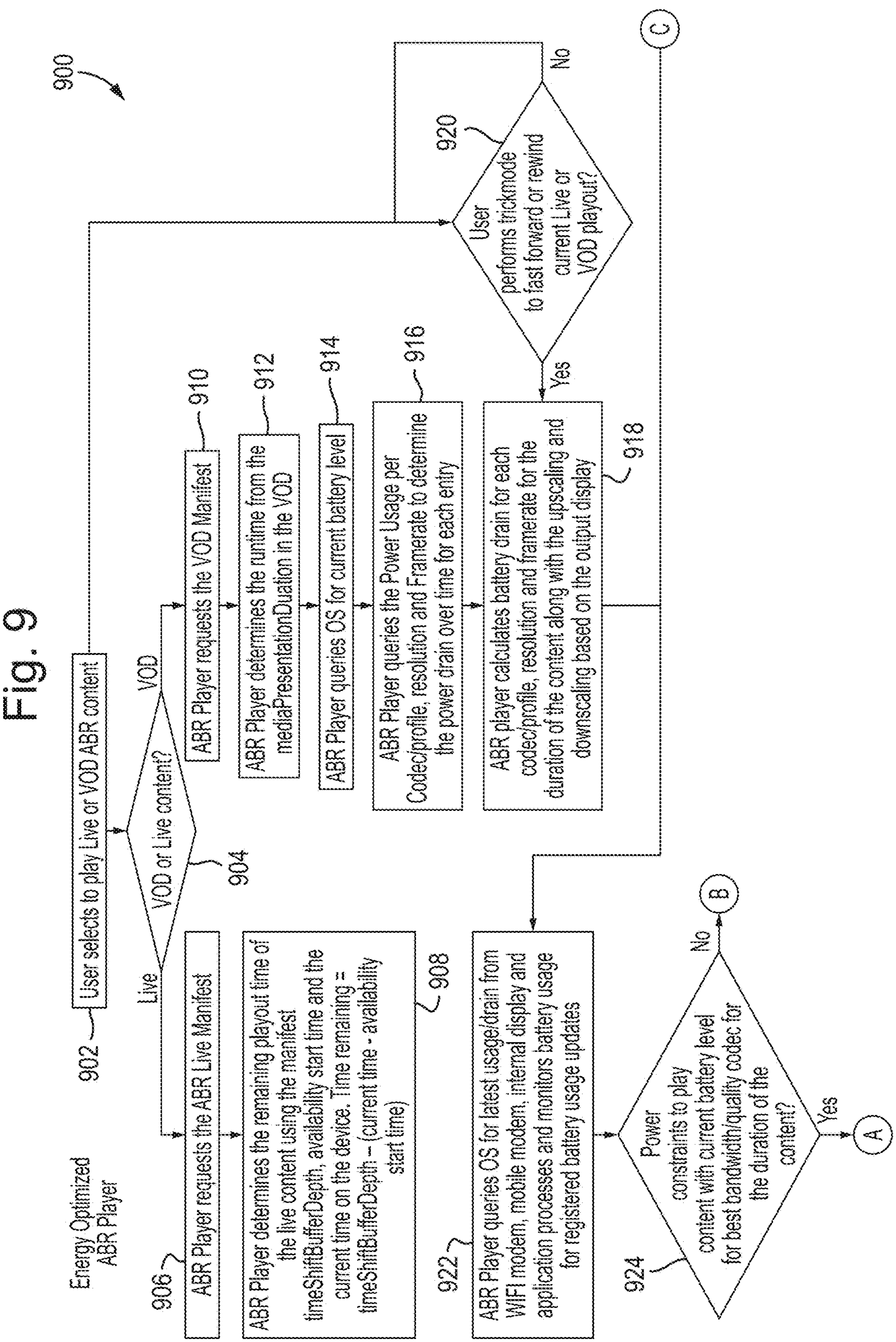
FIG. 9 shows a flow diagram of illustrative steps involved in the improved management of a device power resource during a presentation, on the device, of a content item, in accordance with some implementations of the disclosure.
Figure 9:
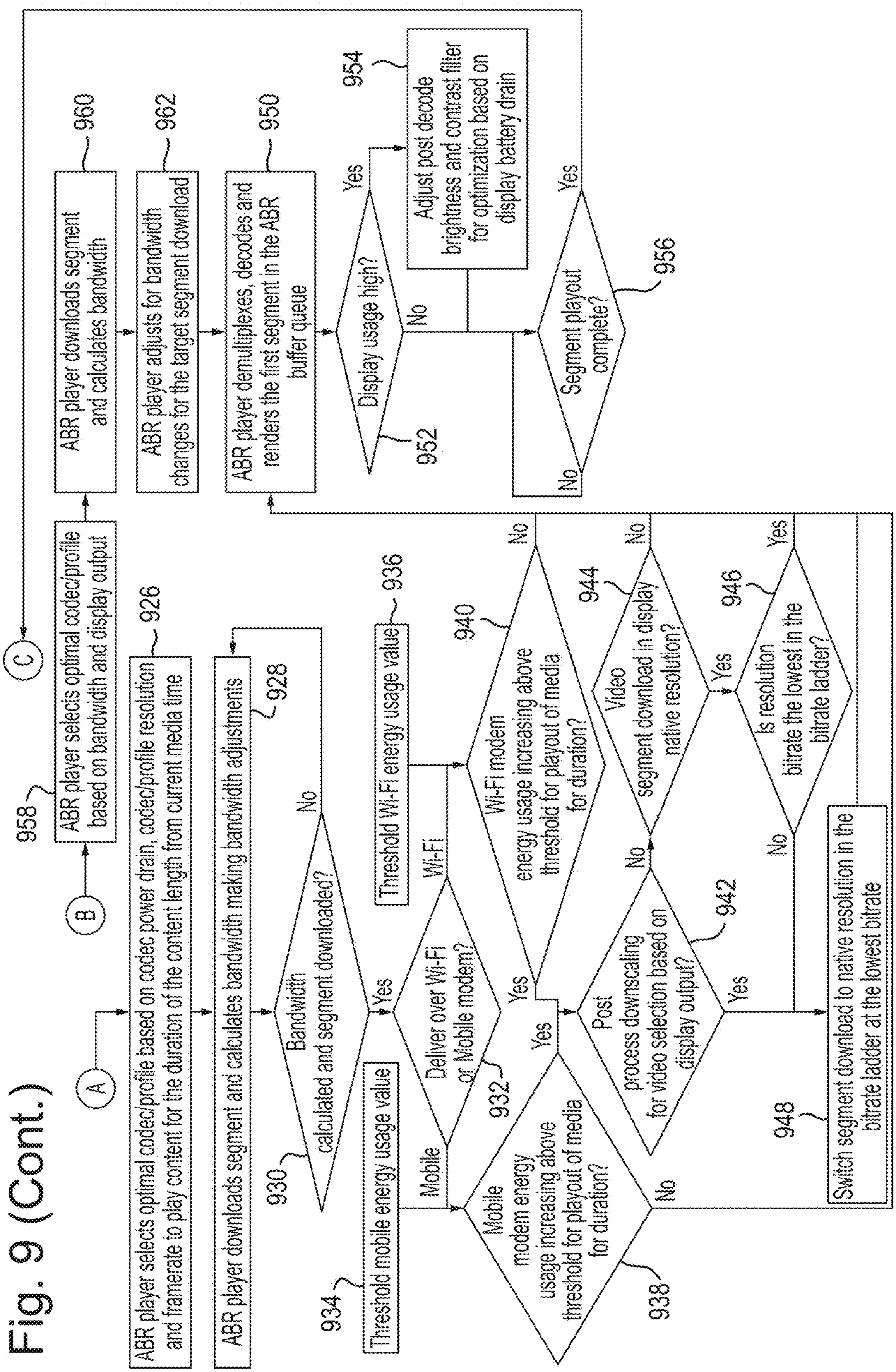

FIG. 9 depicts a flow diagram 900 of illustrative steps involved in the improved management of a device power resource during a presentation, on the device, of a content item, in accordance with some implementations of the disclosure. In some implementations, the device associated with FIG. 9 may be subjected to the set of conditions pertinent to device 102.

At step 902, a player (e.g., ABR player, player 304, 502, 602, 702, or 804, or player associated with device 102) may select, upon a user interface input (e.g., a voice command, gaze-based input, or tactile input), a content item, (e.g., a live or recorded content item) to present on the device. In some implementations, the player may proceed to step 904 if no fast access presentation operation is performed following the selection of the content item or step 920 if a fast access presentation operation is performed following the selection of the content item.

At step 904, the player may determine whether the selected content item is a live content item (e.g., that has never been recorded) or recorded content item (e.g., VOD or live content item that has been recorded). In some implementations, if the selected content item is a live content item, the player may proceed to step 906. In some implementations, if the selected content item is a recorded content item, the player may proceed to step 910.

At step 906, the player may request, from a content provider 828, a manifest (e.g., a manifest file) associated with the selected live content item. The manifest associated with the selected live content item is a live manifest associated with CMAF segments. In some implementations, the player may proceed to step 908.

At step 908, the player may determine a runtime of the live content item (e.g., total runtime if a presentation of the live content item has not started), or a remaining runtime (if the presentation of the live content item has already started) using one or more parameters among a 'timeShiftBufferDepth' parameter, a 'availabilityStartTime' parameter, a current time on the device comprising the player. (Please, refer to description pertaining to FIG. 8 to learn how to determine a total runtime or remaining runtime of a live content item.) In some implementations, the player may proceed to step 914.

At step 910, the player may request, from a content provider (e.g., content provider 828), a manifest (e.g., a manifest file) associated with the selected recorded content item. In some instances, the recorded content item may be a recorded live content item. The recorded live content item was previously presented live and recorded via a user interface input, e.g., on a network digital video recorder (DVR). The recorded live content item is still associated with a live manifest and CMAF segments. Alternatively, the recorded content item may be a VOD and the manifest associated with the VOD is different from a live manifest. In some implementations, the player may proceed to step 912.

At step 912, the player may determine, from the manifest (e.g., a manifest file), a runtime of the recorded content item. In some instances, the player may determine a runtime of the recorded content item by retrieving 'mediaPresentationDuration'. (Please, refer to description pertaining to FIG. 8 to learn how to determine a total runtime of a recorded content item.) In some implementations, the player may proceed to step 914.

At step 914, the player may query an OS (managing the device processes running) to determine a current battery level. In some implementations, the player may proceed to step 916.

At step 916, the player may query the OS about baseline power usages established during the installation or updating of the OS using one or more encoded segment groups associated with a test content item (e.g., video clip) and each encoded segment group being associated with a respective format tuple, comprising a codec (and codec profile), and a set of segment characteristics selected among resolution, frame rate, pixel bit depth, and/or bitrate, and each segment characteristic being set to a value selected among one or more available values. The OS may then determine, for a video clip, baseline power usages associated with presentation (e.g., decoding, post decode processing and/or rendering) of the encoded segment groups over a runtime of the video clip. The OS may then rank the encoded segment groups based on the associated baseline power usages (e.g., from the least power consuming encoded segment group to the most power consuming encoded segment group) or based on the quality associated with the encoded segment group (e.g., from the highest quality encoded segment group to the lowest quality encoded segment group). The OS may also rank the encoded segment groups based on the ratio of the quality to the power usage. In some implementations, the OS may use multiple video clips, aggregate and average the baseline power usages associated with identical encoded segment groups (although associated with different video clips) to establish more refined baseline power usages.

At step 918, using the baseline power usages, a runtime of the requested content item and a list of codecs both used for encoding the requested content item and hardware- and/or software-supported by the device, the player may determine power usages associated with presentation (e.g., decoding, post decode processing and rendering) of encoded segment groups (related to the requested content item and whose codecs belong to the list) over at least the runtime of the requested content item. The manifest may comprise the runtime of the requested content item and the list of codecs used for encoding the requested content item. As for the baseline power usages, the OS may rank the encoded segment groups associated with the requested content item based on, e.g., quality, power usage, ratio of quality to power usage. In some implementations, the player may proceed to step 922.

At step 920, the player may perform, upon a user interface input, a fast access presentation operation (e.g., rewind, fast forward, skip forward, skip backward, one or more trick mode operations, etc.). In some implementations, if the player may do so, the player may proceed to step 918. In some implementations, if not, the player may revert to step 920.

At step 922, the player may query the OS for power usages associated with device components (e.g., Wi-Fi or mobile modem, internal or external display) and applications in use (e.g., background application(s), streaming application, etc.) in order to determine a cumulative power usage corresponding to the battery load. In some implementations, the OS may determine (e.g., in real time or near real time) and report the battery level to the player. In some implementations, the player may proceed to step 924.

At step 924, the player may select, for presentation, a highest or high quality encoded segment group associated with the requested content item to favor user comfort for presentation at the detriment of power consumption, as long as the bitrate of the highest or high quality encoded segment group is equal to or below an available bandwidth of a first communication network (e.g., Wi-Fi or mobile communication network). In some instances, the player may select, for presentation, a lowest or low quality encoded segment group associated with the requested content item to extend the device battery life, as long as the bitrate of the highest or high quality encoded segment group is equal to or below an available bandwidth of a first communication network (e.g., Wi-Fi or mobile communication network). The selected encoded segment group is called the optimal encoded segment group. The player may determine whether the power usage associated with the presentation of the optimal encoded segment group over at least a portion of the runtime of the requested content item may be compatible with the current battery level. In some implementations, if so, the player may proceed to step 926. In some implementations, if not, the player may proceed to step 958. (In some implementations, the player may determine whether the cumulative power usage may be compatible with the current battery level.)

At step 926, the player may start requesting, from a server (e.g., a CDN edge node), the optimal encoded segment group for presentation. In some implementations, the player may proceed to step 928.

At step 928, the player may determine (e.g., in real time or near real time) the available bandwidth of the first communication network and start downloading the optimal encoded segment group if the bitrate associated with the optimal encoded segment group is equal to or below the available bandwidth of the first communication network. If the bitrate associated with the optimal encoded segment group exceeds the available bandwidth of the first communication network, the player may start downloading another encoded segment group that differs with the optimal encoded segment group, e.g., in bitrate value. The bitrate value associated with the other encoded segment group may be lower than the available bandwidth of the first communication network and thus than the bitrate value associated with the optimal encoded segment group. The other encoded segment group becomes the optimal encoded segment group. In some implementations, the player may proceed to step 930.

At step 930, the player may confirm whether the bandwidth of the first communication network has been determined and a download of the optimal encoded segment group has started. In some implementations, if so, the player may proceed to step 932. In some implementations, if not, the player may revert to step 928.

At step 932, the player may determine whether to deliver the downloaded optimal encoded segment group via a Wi-Fi or mobile modem. In some implementations, if the player selects the mobile modem, the player may cause step 934 and proceed to step 938. In some implementations, if the player selects the Wi-Fi modem, the player may cause step 936 and proceed to step 940.

At step 934, the OS may report, to the player, a threshold mobile modem power usage.

At step 936, the OS may report, to the player, a threshold Wi-Fi modem power usage.

At step 938, the player may determine whether the power usage associated with the mobile modem would exceed the threshold mobile modem power usage during the presentation of the requested content item. In some implementations, if so, the player may proceed to step 942. In some implementations, if not, the player may proceed to step 950.

At step 940, the player may determine whether the power usage associated with the Wi-Fi modem would exceed the threshold Wi-Fi modem power usage during the presentation of the requested content item. In some implementations, if so, the player may proceed to step 942. In some implementations, if not, the player may proceed to step 950.

At step 942, the player may determine whether to apply one or more post decode processing filters (multiple example filters have been mentioned throughout the present specification) to a plurality of frames resulting from decoding the optimal encoded segment group. In some instances, the player may determine whether to downscale each frame of the plurality of frames (by reducing pixels while preserving overall content of each frame, causing a resolution reduction) so as to decrease the power usage associated with post decode processing. In some implementations, if so, the player may proceed to step 948. In some implementations, if not, the player may proceed to step 944.

At step 944, the player may determine whether to maintain scaling of the plurality of frames. In some implementations, if so, the player may proceed to step 946. In some implementations, if not, the player may proceed to step 950.

At step 946, the player may determine whether the bitrate associated with the optimal encoded group is the lowest bitrate (e.g., in a bitrate ladder). In some implementations, if so, the player may proceed to step 950. In some implementations, if not, the player may proceed to step 948.

At step 948, the player may switch segment download to native resolution in the bitrate ladder at the lowest bitrate. In some implementations, the player may proceed to step 950.

At step 950, the player may demultiplex, decode, apply the one or more post decode processing to the plurality of frames and renders a first segment of the optimal encoded segment group. In some implementations, the player may proceed to step 952.

At step 952, the play may determine whether a power usage associated with a display (e.g., internal or external display) is above a threshold display power usage. In some implementations, if so, the player may proceed to step 954. In some implementations, if not, the player may proceed to step 956.

At step 954, the player may adjust a post decode processing filter, e.g., controlling contrast and brightness so as to set the power usage associated with the display equal to or below the threshold display power usage.

At step 956, the player may determine whether the presentation of the first segment is complete. In some implementations, if so, the player may proceed to step 922. In some implementations, if not, the player may proceed to step 956.

At step 958, the player may select, for presentation, the optimal encoded segment group associated with the requested content item, whose associated power usage and bitrate are compatible with the current battery level and the available bandwidth. In some implementations, the player may proceed to step 960.

At step 960, the player the player may determine (e.g., in real time or near real time) the available bandwidth of the first communication network and start downloading a first segment of the optimal encoded segment group if the bitrate associated with the optimal encoded segment group does not exceed the available bandwidth. The player may proceed to step 950. If the bitrate associated with the optimal encoded segment group exceeds the available bandwidth, the player may proceed to step 962.

At step 962, the player may adjust for bandwidth changes for the target segment download. The player may elect another encoded segment group as a new optimal encoded segment group, differing, e.g., in bitrate value, from the optimal encoded segment group. The bitrate associated with the new optimal encoded segment group may be equal to or lower than the available bandwidth of the first communication network. In some instances, the bitrate associated with the new optimal encoded segment group may be the closest to and lower than the available bandwidth of the first communication network. The player may start downloading segments of the new optimal encoded segment group In some implementations, the player may proceed to step 950.

In some implementations, FIG. 9 is an example method for the player adjusting based on changing power usage and content length. The device may use an initial power usage per codec (and codec profile), resolution and framerate along with the playout time from a manifest (e.g., a manifest associated with a recorded content such as VOD or a live content). If the manifest is a manifest associated with a live content, a playout time may be calculated based on a duration time, an availability start time and a current time on the device. The device may also consider if the playout is to the internal display or to a connected display for power usage calculation. If the device can play the content completely, the optimal codec (and codec profile), resolution and framerate may be selected strictly based on quality and bandwidth. If the battery cannot sustain the playout for the entire duration of the content, an optimal codec (and codec profile), resolution, and frame rate will be selected based on a power usage and a duration needed for playout. Once this is selected, the player may begin downloading segments for the selected codec, resolution, and frame rate, and calculating a bandwidth available to the device. A resolution may be selected which results in a minimum or low post processing for rendering the content to the display provided the bandwidth supports that resolution. The device may also determine a power usage (e.g., a battery drain) after each download of segments associated with a representation via a modem (e.g., Wi-Fi or mobile modem) used for the download. If the power usage is above a threshold, a check is made to determine if the battery usage is above a threshold power usage. If the battery usage is above the threshold power usage, the bitrate may be adjusted to minimize the power usage associated with segment download. This may continuously update the codec (and codec profile), resolution, and framerate at a segment download level and a choice of all available segments associated with representations (e.g., encoded segment groups) for download may be optimized based on power usage associated with each segment playout.

Figure 10:
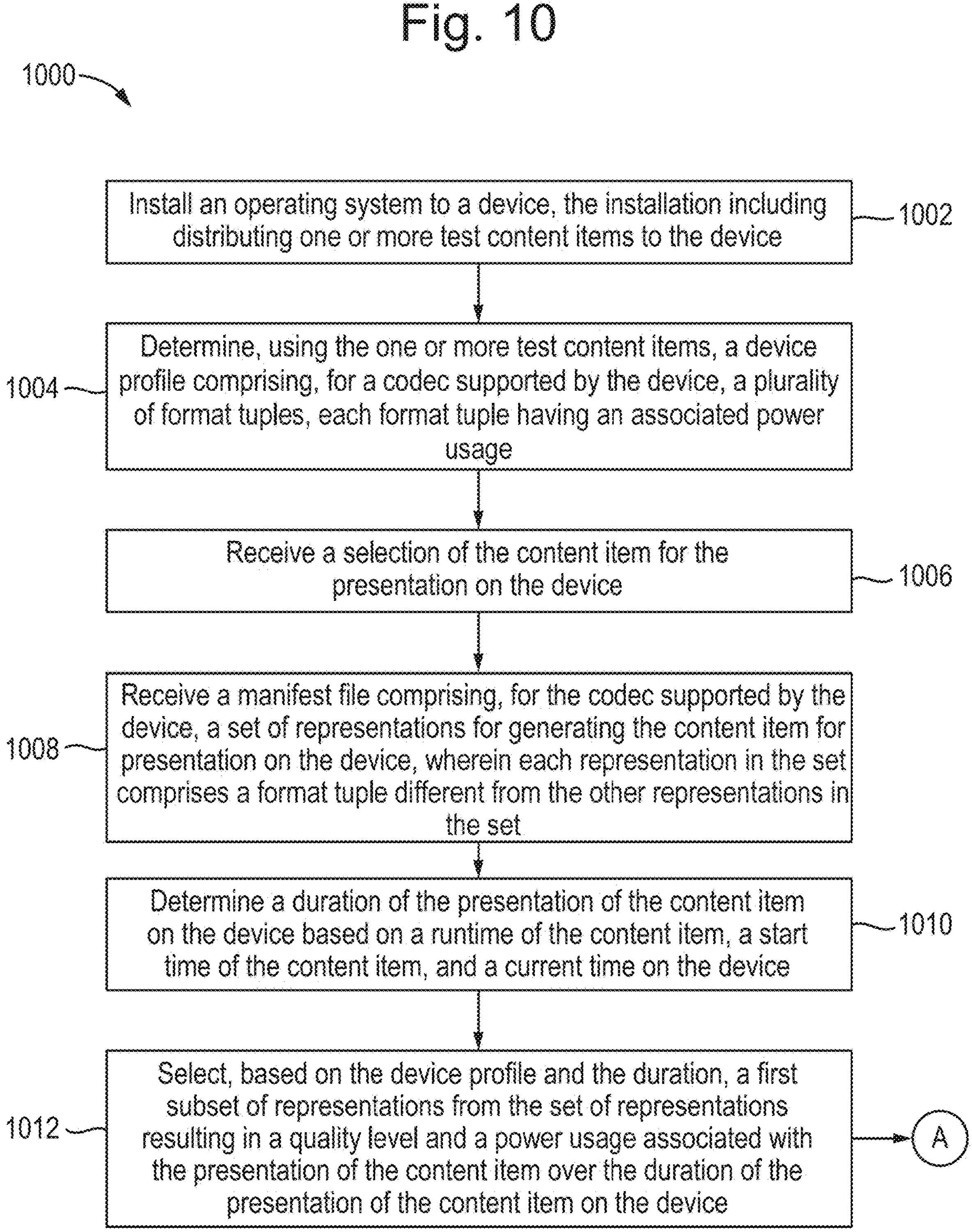
FIG. 10 depicts a flow diagram of illustrative steps involved in the improved management of a device power resource during a presentation, on the device, of a content item, in accordance with some implementations of the disclosure.

FIG. 10 depicts a flow diagram 1000 of illustrative steps involved in the improved management of a device power resource during a presentation, on the device (e.g., device 102, example device 300, device 801 and devices associated with FIGS. 2, 5 to 7 and 9), of a content item (e.g., content item 104*b*), in accordance with some implementations of the disclosure. Process represented by flow diagram 1000 may be implemented, in whole or in part, on any of the aforementioned devices. In addition, one or more actions of the process 1000 may be incorporated into or combined with one or more actions of any other processes or embodiments described herein.

At step 1002, control circuitry of the device may install an operating system to a device, the installation including distributing representations of one or more test content items to the device. In some instances, the control circuitry of the device may then proceed to step 1004.

At step 1004, the control circuitry of the device may determine, using the one or more test content items, a device profile comprising, for a codec (and codec profile) supported by the device, a plurality of format tuples, each format tuple having an associated power usage (e.g., a baseline power usage). In some instances, each test content item may comprise a set of representations, each representation (e.g., encoded segment group) being associated with a respective format tuple comprising, for example, a codec and codec profile (e.g., device supported codec and codec profile) and a set of segment characteristics (e.g., device supported segment characteristics) selected among resolution, frame rate, pixel bit depth, and/or bitrate, each segment characteristic being set to a value selected among one or more available values. In some instances, the control circuitry of the device may then proceed to step 1006.

At step 1006, the control circuitry of the device may receive, via input/output circuitry, a selection of the content item for the presentation on the device. In some instances, the control circuitry of the device may then proceed to step 1008.

At step 1008, the control circuitry of the device may receive, via the input/output circuitry, a manifest file comprising, for a codec supported by the device, a set of representations for generating the content item for presentation on the device, wherein each representation in the set comprises a format tuple different from the other representations in the set. For example, a first representation of the set of representations may have a first bitrate and a first quality level, a second representation of the set of representations may have the first bitrate and a second quality level, and a third representation of the set of representations may have a second bitrate and the second quality level. In some instances, the control circuitry of the device may then proceed to step 1010.

At step 1010, the control circuitry of the device may determine a duration of the presentation of the content item on the device. For example, the duration of the presentation of the content item may be based on a runtime of the content item, a start time of the content item, and/or a current time on the device. In some instances, the control circuitry of the device may then proceed to step 1012.

At step 1012, the control circuitry of the device may select, based on the device profile and the duration, a first subset of representations from the set of representations resulting in a quality level (e.g., a higher quality level, a lower quality level or an optimal quality level based on power usage) and a power usage, both associated with the presentation of the content item over the duration of the presentation of the content item on the device. For example, the first quality level may be set at a quality level that results in, e.g., a highest, intermediate or lowest permissible quality level over the duration of the content item based on at least one of the determined baseline power usages. In some instances, the control circuitry of the device may then proceed to step 1014.

At step 1014, the control circuitry of the device may determine (e.g., in real time or near real-time) a power usage value associated with one or more device processes. In some instances, the control circuitry of the device may determine (e.g., in real time or near real-time) a cumulative power usage associated with all device processes running on the device at a time point. In some instances, the control circuitry of the device may then proceed to step 1016.

At step 1016, the control circuitry of the device may determine whether the device is plugged into an external power source (e.g., electrical grid, or generator). For example, a power usage value may be determined based on a currently selected representation and a currently selected screen brightness level. In some instances, if so, the control circuitry may proceed to step 1018. In some instances, if not, the control circuitry may proceed to step 1026.

At step 1018, the control circuitry of the device may determine whether a battery level of the device is below a threshold charge level, e.g., 20% or 10%, or a level based on a selected operational mode of the device, e.g., "Focus Mode", or "Low Power Mode". In some instances, if so, the control circuitry may proceed to step 1020. In some instances, if not, the control circuitry may proceed to step 1024.

At step 1020, the control circuitry of the device may determine whether the selected first subset of representations is to be maintained. In some instances, if so, the control circuitry may proceed to step 1022. In some instances, if not, the control circuitry may proceed to step 1024.

At step 1022, the control circuitry of the device may maintain the selected first subset of representations. In some instances, the control circuitry of the device may then proceed to step 1034.

At step 1024, the control circuitry of the device may select a second subset of representations from the set of representations resulting in an increase in the quality associated with the presentation of the content item over the duration of the presentation of the content item on the device, e.g., so as to achieve a second quality level higher than the first quality level. In some instances, the control circuitry of the device may then proceed to step 1034.

At step 1026, the control circuitry of the device may determine whether the power usage value has exceeded a threshold value. If so, the control circuitry may proceed to step 1028. If not, the control circuitry may proceed to step 1022.

At step 1028, the control circuitry of the device may determine whether modifying operation of a background application(s) lowers the power usage value below the threshold value. For example, would restricting, pausing/halting or stopping a background application(s) lower the power usage value below the threshold value? In some instances, if so, the control circuitry may then modify the operation of a background application(s) by restricting, pausing/halting or stopping the background application(s) and proceed to step 1022. If not, the control circuitry may not then modify the operation of a background application(s) and proceed to step 1030.

At step 1030, the control circuitry of the device may determine whether modifying operation of a device process(es) lowers the power usage value below the threshold value. For example, would restricting a device process(es) associated with post-decode processing lower the power usage value below the threshold value? In some instances, if so, the control circuitry may then modify the operation of a device process(es) by restricting a device process(es) associated with post-decode processing and proceed to step 1022. In some instances, if not, the control circuitry may not then modify the operation of a device process(es) and proceed to step 1032.

At step 1032, the control circuitry of the device may select a third subset of representations from the set of representations resulting in a decrease in the quality associated with the presentation of the content item over the duration of the presentation of the content item on the device so as to achieve, e.g., so as to reach a third quality level lower than the first quality level and second quality level. In some instances, the control circuitry of the device may then proceed to step 1034.

At step 1034, the control circuitry of the device may request, for presentation, one or more segments associated with the selected first, second, or third subset of representations when the control circuitry of the device has proceeded via step 1022, step 1024 or step 1032, respectively. In some instances, the control circuitry of the device may then proceed to step 1036.

At step 1036, the control circuitry of the device may determine, based on historic selection or presentation of content items, whether an upcoming selection of another one or more content items for presentation on the device may occur. For example, the control circuitry may access a user profile to determine a probability that a user may select or allow autoplay of another one or more content items, e.g., one or more next episodes in a series. In some instances, if so, the control circuitry of the device may proceed to step 1040. In some instances, if not, the control circuitry of the device may proceed to step 1038

At step 1038, the control circuitry of the device may play content item(s) for their duration (e.g., until power dies, or "Low Power Mode" reached, enabling calls to be made or received, emails to be sent or received, etc.).

At step 1040, the control circuitry of the device may determine a number 'N' of segments associated with the selected first, second, or third subset of representations, that remain to be requested. In some instances, 'N' may be a positive natural integer different from zero. In some instances, 'N' may be high, e.g., such that segments after start credits may remain to be requested and presented. In some instances, 'N' may be low, e.g., such that segments after end credits may remain to be requested and presented. In some instances, the control circuitry of the device may proceed to step 1042.

At step 1042, the control circuitry of the device may determine a new duration of the presentation of the content items (e.g., portion of the originally selected content item plus the other one or more next content items to be presented) on the device based on a runtime of the content items, a start time of the content items, and a current time on the device. The new duration may thus correspond in part to presentation of the segments (associated with the originally selected content item), that remain to be requested. In some instances, the control circuitry of the device may proceed to step 1044.

At step 1044, the control circuitry of the device may select, based on the predicted upcoming selection, the device profile and the new duration, a fourth subset of representations from the set of representations associated with the content items. In some instances, depending upon the amount of power available, the fourth subset of representations from the set of representations associated with the selected other content item may comprise format tuples matching at least a portion of format tuples of the first subset of representations from the set of representations associated with the selected content item. In some instances, the control circuitry of the device may proceed to step 1038.

In some implementations, steps 1036 to 1044 may be removed such that step 1038 is consecutive to step 1034. Step 1006 may comprise step 1036. If an upcoming selection of another one or more content items for presentation on the device occur, step 1008 may change to receive each manifest file associated with the content items (e.g., the originally selected content item plus the other one or more next content items to be presented). If the upcoming selection of the other one or more content items for presentation on the device occur, step 1010 may change to "determine a duration of the presentation of the content items on the device based on a runtime of the content items, a start time of the content items, and a current time on the device". If the upcoming selection of the other one or more content items for presentation on the device occur, step 1012 may change to "select a first subset of representations from the set of representations resulting in an optimized quality associated with the presentation of the content items over the duration of the presentation of the content items on the device". Steps 1014 to 1034 and 1038 may remain unchanged.

FIG. 11 shows a portion of an example manifest file 1100 (e.g., Live DASH Manifest file) for enabling the improved and coordinated presentation of a multi-component media content across multiple devices. The portion of the example manifest file 1100 may comprise multiple representations, each representation (e.g., an encoded segment group) being associated with a format tuple, each format tuple comprising a codec (and codec profile), and a set of segment characteristics selected among resolution, frame rate, pixel bit depth and/or bitrate.

The portion of the example manifest file 1100 may comprise multiple video representations, each video representation being associated with a format tuple, each video format tuple comprising a video codec (and codec profile), and a set of video segment characteristics (e.g., resolution, frame rate, pixel bit depth, and/or bitrate). For example, the portion of the example manifest 1100 comprises a first representation 1101 whose format tuple comprises codec profile 1102 (e.g., AVC/H.264 base profile), resolution 1104 (e.g., '1080p30'), frame rate 1106 (e.g., 30 Hz), bitrate 1108 (e.g., 8 Mbps). For example, the portion of the example manifest 1100 comprises a second representation 1111 whose format tuple comprises codec profile 1102 (e.g., AVC/H.264 base profile), resolution 1114 (e.g., '360p30'), frame rate 1116 (e.g., 30 Hz), bitrate 1118 (e.g., 350 Kbps). For the sake of clarity, other representations were removed from the portion of the example manifest file 1100. 'AdaptationSet id' 1131 is a term used in DASH that shall be understood to mean identity of a subset of set of representations, each representation of the subset being associated with a format tuple comprising a same codec (and codec profile).

In some implementations, the portion of the example manifest file 1100 may comprise multiple audio representations, each audio representation associated with an audio format tuple, each audio format tuple comprising a language type, an audio codec (and codec profile), and a plurality of audio segment characteristics (e.g., selected among resolution, bitrate, sampling rate, audio bit depth and/or number of channels). For example, the portion of the example manifest 1100 comprises a single audio representation 1121 that is common for all video representations. The audio format tuple associated with the single audio representation comprises an audio codec 1122 (e.g., 'mp4a.40.2'), resolution 1124 (e.g., 'audio_128 kpbs') and bitrate 1128 (e.g., 128 kbps). The audio format tuple associated with the single audio representation may comprise a language type (such as English, French, Spanish, Chinese).

Figure 12:
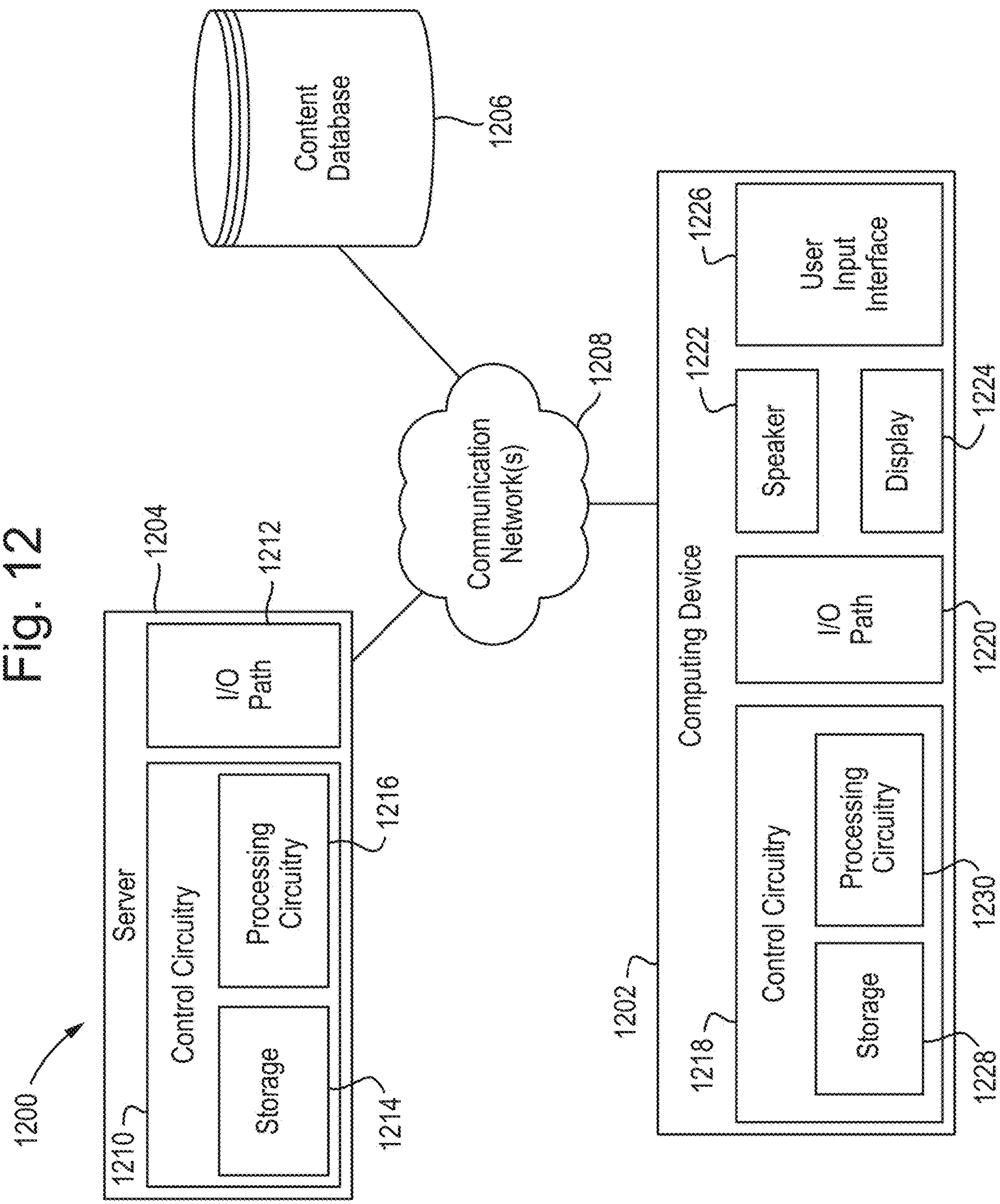
FIG. 12 illustrates a block diagram showing components of an example system for enabling the improved and coordinated presentation of a multi-component media content across multiple devices.

FIG. 12 illustrates a block diagram showing components of an example system for enabling the improved and coordinated presentation of a multi-component media content across multiple devices. Although FIG. 12 shows system 1200 as including a number and configuration of individual components, in some examples, any number of the components of system 1200 is combined and/or integrated as one device. System 1200 includes computing device 1202 (e.g., device 102, example device 300, device 801 and devices associated with FIGS. 2, 5 to 7 and 9), server 1204 (e.g., CDN edge node 444 or 832), and content database 1206, each of which is communicatively coupled to communication network 1208, which is the Internet or any other suitable network or group of networks. In some examples, system 1200 excludes server 1204, and functionality that would otherwise be implemented by server 1204 is instead implemented by other components of system 1200, such as computing device 1202. In still other examples, server 1204 works in conjunction with computing device 1202 to implement certain functionality described herein in a distributed or cooperative manner.

Server 1204 includes control circuitry 1210 and input/output (I/O) path 1212, and control circuitry 1210 includes storage 1214 and processing circuitry 1216. Computing device 1202, which can be a personal computer, a laptop computer, a tablet computer, a smartphone, a smart television, a smart speaker, or any other type of computing device, includes control circuitry 1218, I/O path 1220, speaker 1222, display 1224, and user input interface 1226, which in some examples provides a user selectable option for enabling and disabling the display of modified closed captions. Control circuitry 1218 includes storage 1228 and processing circuitry 1230. Control circuitry 1210 and/or 1218 is based on any suitable processing circuitry such as processing circuitry 1216 and/or 1230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and includes a multi-core processor (e.g., dual-core, quad-core, hexa-core, or any suitable number of cores). In some examples, processing circuitry is distributed across multiple separate processors, for example, multiple of the same type of processors (e.g., two Intel Core i9 processors) or multiple different processors (e.g., an Intel Core i7 processor and an Intel Core i9 processor).

Each of storage 1214, storage 1228, and/or storages of other components of system 1200 (e.g., storages of content database 1206, and/or the like) is an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 1214, storage 1228, and/or storages of other components of system 1200 is used to store various types of content, metadata, and or other types of data. Non-volatile memory also is used (e.g., to launch a boot-up routine and other instructions). Cloud-based storage is used to supplement storages 1214, 1228 or instead of storages 1214, 1228. In some examples, control circuitry 1210 and/or 1218 executes instructions for an application stored in memory (e.g., storage 1214 and/or 1228). Specifically, control circuitry 1210 and/or 1218 is instructed by the application to perform the functions discussed herein. In some implementations, any action performed by control circuitry 1210 and/or 1218 is based on instructions received from the application. For example, the application is implemented as software or a set of executable instructions that is stored in storage 1214 and/or 1228 and executed by control circuitry 1210 and/or 1218. In some examples, the application is a client/server application where only a client application resides on computing device 1202, and a server application resides on server 1204.

The application is implemented using any suitable architecture. For example, it is a stand-alone application wholly implemented on computing device 1202. In such an approach, instructions for the application are stored locally (e.g., in storage 1228), and data for use by the application is downloaded on a periodic basis (e.g., from an out-of-band feed, from an Internet resource, or using another suitable approach). Control circuitry 1218 retrieves instructions for the application from storage 1228 and process the instructions to perform the functionality described herein. Based on the processed instructions, control circuitry 1218 determines what action to perform when input is received from user input interface 1226.

In client/server-based examples, control circuitry 1218 includes communication circuitry suitable for communicating with an application server (e.g., server 1204) or other networks or servers. The instructions for carrying out the functionality described herein are stored on the application server. Communication circuitry includes a cable modem, an Ethernet card, or a wireless modem for communication with other equipment, or any other suitable communication circuitry. Such communication involves the Internet or any other suitable communication networks or paths (e.g., communication network 1208). In another example of a client/server based application, control circuitry 1218 runs a web browser that interprets web pages provided by a remote server (e.g., server 1204). For example, the remote server stores the instructions for the application in a storage device. The remote server processes the stored instructions using circuitry (e.g., control circuitry 1210) and/or generates displays. Computing device 1202 receives the displays generated by the remote server and displays the content of the displays locally via display 1224. This way, the processing of the instructions is performed remotely (e.g., by server 1204) while the resulting displays are provided locally on computing device 1202. Computing device 1202 receives inputs from the user via input interface 1226 and transmits those inputs to the remote server for processing and generating the corresponding displays.

A user sends instructions, e.g., to view an interactive media content item and/or selects one or more programming options of the interactive media content item, to control circuitry 1210 and/or 1218 using user input interface 1226. User input interface 1226 is any suitable user interface, such as a remote control, trackball, keypad, keyboard, touchscreen, touchpad, stylus input, joystick, speech recognition interface, gaming controller, or other user input interfaces. User input interface 1226 is integrated with or combined with display 1224, which can be a monitor, a television, a liquid crystal display (LCD), an electronic ink display, or any other equipment suitable for displaying visual images.

Server 1204 and computing device 1202 transmits and receives content and data via I/O path 1212 and 1220, respectively. For instance, I/O path 1212 and/or I/O path 1220 includes a communication port(s) configured to transmit and/or receive (for instance to and/or from content database 1206), via communication network 1208, content item identifiers, content metadata, natural language queries, and/or other data. Control circuitry 1210, 1218 is used to send and receive commands, requests, and other suitable data using I/O paths 1212, 1220. I/O paths 1212 of server 1200 and I/O paths 1220 of computing device 1202 each comprises I/O circuitry, e.g., network interface, port, bus, wire.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flow diagrams or examples relating to one example may be combined with any other example in a suitable manner, done in different orders, or done in parallel. In addition, the systems and methods described herein may be performed in real time or near real time. It should also be noted that the systems and/or methods described above may be applied to, or used in accordance with, other systems and/or methods.

What is claimed is:

1. A method for managing device power resource during a presentation of a content item, the method comprising:

determining a device profile comprising, for a codec supported by the device, a plurality of format tuples, each format tuple having an associated power usage;

receiving a selection of the content item for the presentation on the device;

receiving a manifest file comprising, for the codec supported by the device, a set of representations for generating the content item for presentation on the device, wherein each representation in the set comprises a format tuple different from the other representations in the set; and selecting, based on the device profile, a first subset of representations from the set of representations resulting in a quality level and a power usage associated with the presentation of the content item over the duration of the presentation of the content item on the device.

2. The method of claim 1, wherein:

each format tuple comprises the codec and a set of segment characteristics, wherein:

the set of segment characteristics comprises a resolution, a frame rate, a pixel bit depth and/or bitrate.

3. The method of claim 1, the method further comprising:

installing an operating system to the device, the installation including distributing test content items to the device; and determining the device profile using the test content items.

4. The method of claim 1, the method further comprising:

determining a power usage value associated with one or more device processes; and determining the first subset of representations from the set of representations based on the power usage value.

5. The method of claim 4, wherein the determining the power usage value associated with the one or more device processes comprises at least one of:

i) retrieving, from the device profile, information associated with the power usage value; or ii) determining in real time the power usage value associated with the one or more device processes.

6. The method of claim 4, the method further comprising:

determining that the power usage value has exceeded a threshold value; and causing the one or more device processes to be restricted when the power usage value has exceeded the threshold value.

7. The method of claim 6, wherein the causing the one or more device processes to be restricted comprises at least one of:

i) restricting, pausing or stopping a background application; or ii) restricting a device process associated with post-decode processing.

8. The method of claim 1, the method further comprising:

determining, while the device is charging, that a battery level of the device is below a threshold charge level; and causing:

i) maintaining the selected first subset of representations resulting in an optimized battery charging speed until the battery level of the device exceeds the threshold charge level; or ii) selecting a second subset of representations from the set of representations resulting in an increase in the quality associated with the presentation of the content item over the duration of the presentation of the content item on the device.

9. The method of claim 1, the method further comprising:

predicting an upcoming selection of another content item for presentation on the device based on historic selection of content items; and selecting the first subset of representations from the set of representations based on the predicted upcoming selection and the device profile.

10. The method of claim 1, wherein the determining the first subset of representations from the set of representations comprises:

determining a quality distortion metric for each representation of the set of representations; and selecting, from the set of representations, representations having lower quality distortion metrics.

11. A system for managing device power resource during a presentation of a content item, the system comprising:

input/output circuitry;

control circuitry configured to:

determine a device profile comprising, for a codec supported by the device, a plurality of format tuples, each format tuple having an associated power usage;

receive, via the input/output circuitry, a selection of the content item for the presentation on the device;

receive, via the input/output circuitry, a manifest file comprising, for the codec supported by the device, a set of representations for generating the content item for presentation on the device, wherein each representation in the set comprises a format tuple different from the other representations in the set; and select, based on the device profile, a first subset of representations from the set of representations resulting in a quality level and a power usage associated with the presentation of the content item over the duration of the presentation of the content item on the device.

12. The system of claim 11, wherein:

each format tuple comprises the codec and a set of segment characteristics, wherein:

the set of segment characteristics comprises a resolution, a frame rate, a pixel bit depth and/or bitrate.

13. The system of claim 11, wherein the control circuitry is further configured to:

install an operating system to the device, the installation including distributing test content items to the device; and determine the device profile using the test content items.

14. The system of claim 11, wherein the control circuitry is further configured to:

determine a power usage value associated with one or more device processes; and determine the first subset of representations from the set of representations based on the power usage value.

15. The system of claim 14, wherein the control circuitry is further configured to determine the power usage value associated with the one or more device processes by:

i) retrieving, from the device profile, information associated with the power usage value; and/or ii) determining in real time the power usage value associated with the one or more device processes.

16. The system of claim 14, wherein the control circuitry is further configured to:

determine that the power usage value has exceeded a threshold value; and cause the one or more device processes to be restricted when the power usage value has exceeded the threshold value.

17. The system of claim 16, wherein the control circuitry is further configured to cause the one or more device processes to be restricted by:

i) restricting, pausing or stopping a background application; and/or ii) restricting a device process associated with post-decode processing.

18. The system of claim 11, wherein the control circuitry is further configured to:

determine, while the device is charging, that a battery level of the device is below a threshold charge level; and cause:

i) maintaining the selected first subset of representations resulting in an optimized battery charging speed until the battery level of the device exceeds the threshold charge level; or ii) selecting a second subset of representations from the set of representations resulting in an increase in the quality associated with the presentation of the content item over the duration of the presentation of the content item on the device.

19. The system of claim 11, the control circuitry is further configured to:

predict an upcoming selection of another content item for presentation on the device based on historic selection of content items; and select the first subset of representations from the set of representations based on the predicted upcoming selection and the device profile.

20. The system of claim 11, wherein the control circuitry is further configured to determine the first subset of representations from the set of representations by:

determining a quality distortion metric for each representation of the set of representations; and selecting, from the set of representations, representations having lower quality distortion metrics.

* * * * *